(12) United States Patent
Tanizawa et al.

(10) Patent No.: US 8,782,448 B2
(45) Date of Patent: Jul. 15, 2014

(54) COMMUNICATION DEVICE FOR TRANSMITTING RECEIVED START-UP SIGNAL AND POWER SIGNAL FOR STARTING UP A DESIGNATED NODE

(75) Inventors: Yoshimichi Tanizawa, Kanagawa-ken (JP); Takeshi Ishihara, Kanagawa-ken (JP); Kotaro Ise, Kanagawa-ken (JP); Eiji Kamagata, Kanagawa-ken (JP); Yuichiro Oyama, Tokyo (JP); Takaomi Murakami, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 472 days.

(21) Appl. No.: 13/231,607

(22) Filed: Sep. 13, 2011

(65) Prior Publication Data

US 2012/0079297 A1    Mar. 29, 2012

(30) Foreign Application Priority Data

Sep. 28, 2010    (JP) ................................. 2010-217267

(51) Int. Cl.
  *G06F 1/26*    (2006.01)
(52) U.S. Cl.
  USPC .......................................... 713/310; 713/300
(58) Field of Classification Search
  USPC ................................................ 713/300, 310
  See application file for complete search history.

(56) References Cited

U.S. PATENT DOCUMENTS

| 7,865,252 | B2 * | 1/2011 | Clayton | ........................ 700/19 |
| 8,049,484 | B2 * | 11/2011 | Vetteth | ......................... 323/355 |
| 2005/0249245 | A1 | 11/2005 | Hazani et al. | |
| 2006/0022802 | A1 * | 2/2006 | Bridgelall | ................. 340/10.33 |
| 2008/0280569 | A1 | 11/2008 | Hazani et al. | |

FOREIGN PATENT DOCUMENTS

| JP | 2006-325046 | 11/2006 |
| JP | 2006-352806 | 12/2006 |
| JP | 2007-536870 | 12/2007 |
| JP | 2010-035028 | 2/2010 |

* cited by examiner

*Primary Examiner* — Thuan Du
(74) *Attorney, Agent, or Firm* — Amin, Turocy & Watson, LLP

(57) ABSTRACT

According to one embodiment, a communication device includes a start-up signal reception unit that receives a start-up signal that a start node transmits for starting up a node to be started; a first interface connected to Ethernet; a second interface connected to Ethernet; a power reception unit that receives PoE power through the first interface; a PoE controller that receives the start-up signal and PoE power and gives a transmission instruction of a start-up power signal which is a PoE power signal having a signal pattern corresponding to the start-up signal; and a power transmission unit that receives the transmission instruction from the PoE controller and transmits the start-up power signal through the second interface.

11 Claims, 24 Drawing Sheets

FIG. 9
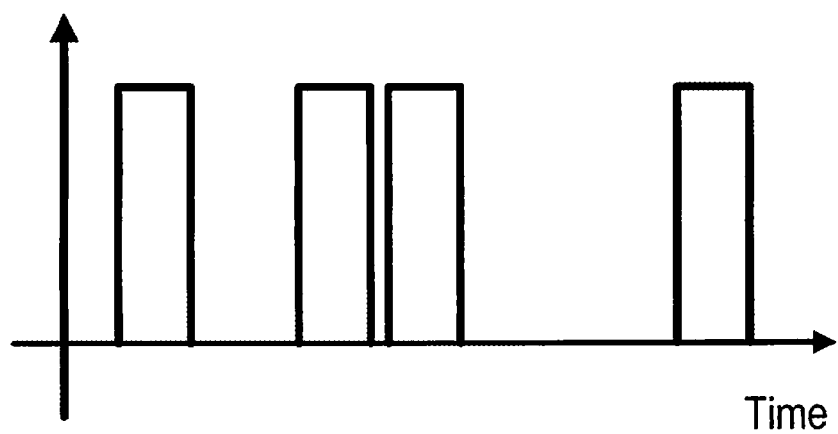
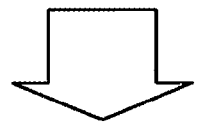
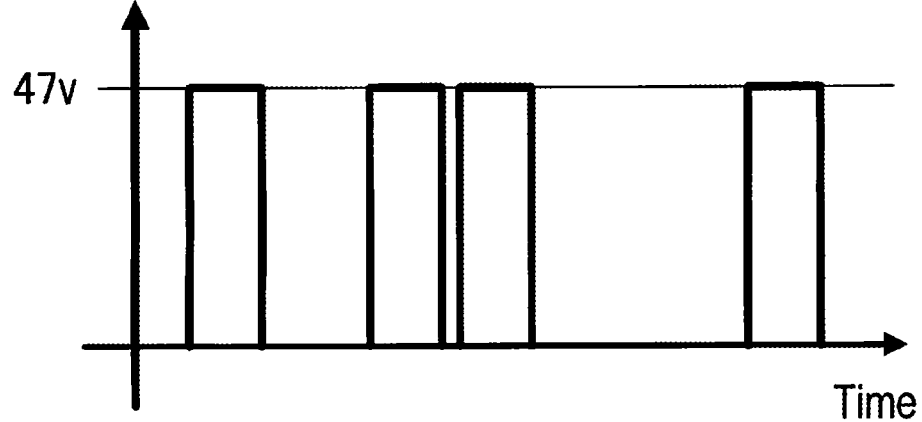

FIG.11
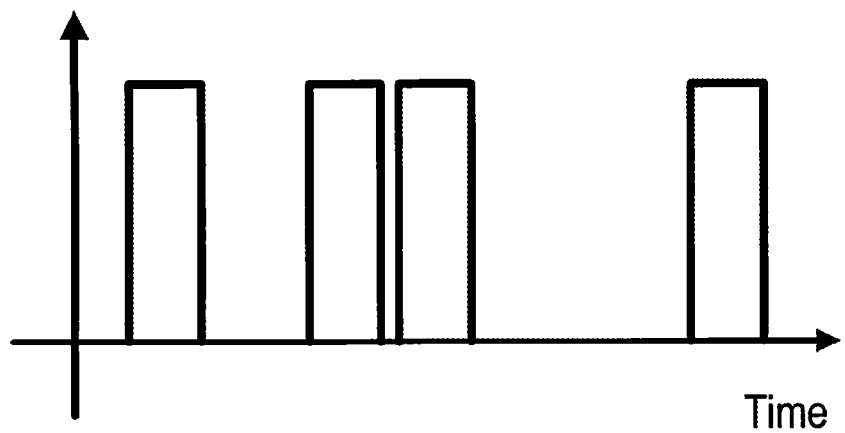
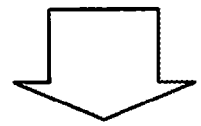
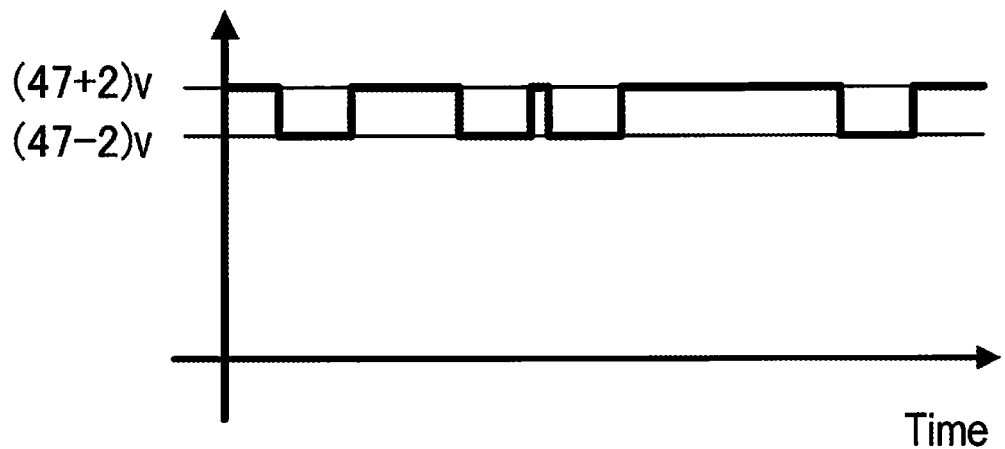

FIG.23A

| Hash algorithm | INT(MAC^seed) mod Node group address length |
|---|---|
| Node group address length | 8-bit |
| seed | 1,1.1,1.2,...,(1+0.1N) |

FIG.23B

| Node1 | Node2 | Node3 | Node4 | Node5 | Node6 | Node7 | Node8 | Node9 | Node10 |
|---|---|---|---|---|---|---|---|---|---|
| 12 | 11 | 57 | 97 | 30 | 46 | 37 | 27 | 32 | 50 |

First group: Belonging set (Node1–Node3), Non-belonging set (Node4–Node10)

Second group: Belonging set (Node1–Node6), Non-belonging set (Node7–Node10)

COMMUNICATION DEVICE FOR TRANSMITTING RECEIVED START-UP SIGNAL AND POWER SIGNAL FOR STARTING UP A DESIGNATED NODE

CROSS-REFERENCE TO RELATED APPLICATION

This application is based upon and claims the benefit of priority from the prior Japanese Patent Application No. 2010-217267 filed on Sep. 28, 2010, the entire contents of which are incorporated herein by reference.

FIELD

Embodiments described herein relate generally to a communication device, a start node, and a system.

BACKGROUND

In a communication system, there is a case where a given node (hereinafter, referred to as "start node") needs to remote-start a remotely-installed communication node (hereinafter, referred to as "node to be started") in order for the start node to utilize a function of the node to be started.

A remote start method in a communication system roughly includes two types: one is an inbound system, and the other is an outbound system.

The inbound system is a system in which the start node transmits a start-up signal to the node to be started by using a communication link for data communication. The outbound system is a system in which the start node transmits the start-up signal to the node to be started by using a notification means different from the communication link.

A typical example of the inbound system is WoL (Wake On LAN). In the WoL, the start node transmits a packet having a format called "magic packet" to the node to be started. When detecting the magic packet, the node to be started is turned on and started up. In the WoL, the node to be started needs to always make a network interface in a conduction state in order to detect the magic packet. Therefore, power is consumed even in a standby state before start-up.

In the outbound system, a near field communication used in, e.g., RFID (Radio Frequency IDentification) is used as a start-up signal transmission link different from the communication link. Among the near field communication systems such as RFID, a system called "passive tag system" uses a high-sensitivity rectifier for start-up power control of the node to be started to thereby eliminate the need to consume standby power in a standby state for waiting the start-up signal. More concretely, in the passive tag system, the start-up signal that the start node has transmitted using the near field communication is converted, when being received by the node to be started, into electric power by means of the high-sensitivity rectifier for use in control of initial start-up.

BRIEF DESCRIPTION OF THE DRAWINGS

FIG. 9 is a view illustrating a first example of the correspondence relationship between the reception signal intensity of the start-up signal in the start node side adapter 110 of FIG. 4 and supply voltage of the start-up power signal;

FIG. 11 is a view illustrating a second example of the correspondence relationship between the reception signal intensity of the start-up signal in the start node side adapter 110 of FIG. 4 and supply voltage of the start-up power signal;

FIGS. 23A and 23B are views illustrating parameters in a group address determination procedure in the communication system according to the second embodiment of the present invention.

DETAILED DESCRIPTION

According to one embodiment, a communication device includes a signal reception unit that receives a start-up signal that a start node transmits for starting up a node to be started; a first interface connected to Ethernet (registered trademark: hereinafter, this notation is omitted); a second interface connected to Ethernet; a power reception unit that receives PoE power through the first interface; a PoE controller that receives the start-up signal and PoE power and gives a transmission instruction of a start-up power signal which is a PoE power signal having a signal pattern corresponding to the start-up signal; and a power transmission unit that receives the transmission instruction from the PoE controller and transmits the start-up power signal through the second interface.

Hereinafter, embodiments of the present invention will be described with reference to the accompanying drawings.

<First Embodiment>

Figure 1:
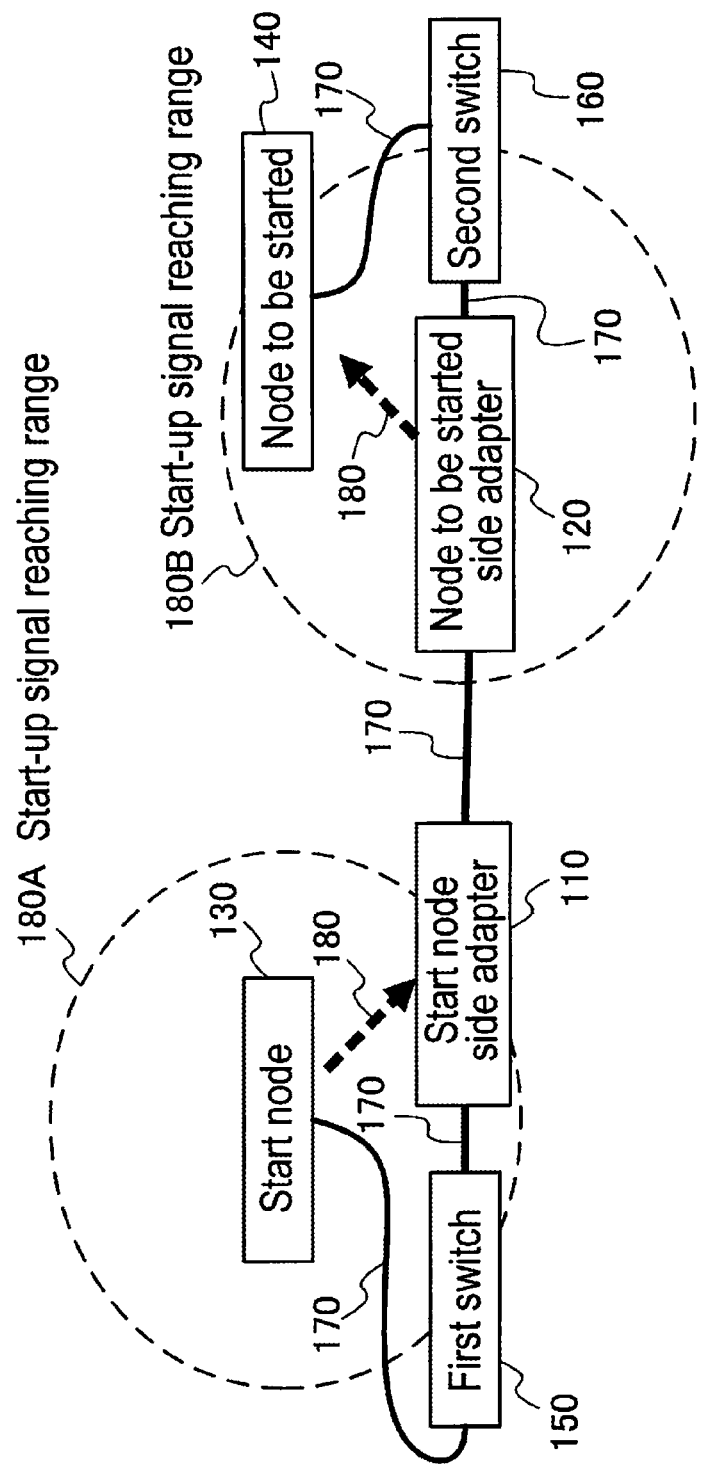
FIG. 1 is a view illustrating a configuration of a communication system according to a first embodiment of the present invention.

FIG. 1 illustrates a configuration of a communication system according to a first embodiment of the present invention. The communication system is a system including a start node 130, a first switch 150, a start node side adapter 110, a node to be started side adapter 120, a second switch 160, and a node 140 to be started.

The first switch 150 and start node side adapter 110, the start node side adapter 110 and node to be started side adapter 120, and the node to be started side adapter 120 and second switch 160 are connected by Ethernet with PoE (Power Over Ethernet). The start node 130 and first switch 150, and second switch 160 and node 140 to be started may be connected by Ethernet 170 or they need not always be connected. In the example of FIG. 1, the start node 130 and first switch 150, and second switch 160 and node 140 to be started are connected by Ethernet 170.

Although the numbers of the start node 130 and node 140 to be started are one, respectively in the example of FIG. 1, the numbers of the start node 130 and node 140 to be started are not especially limited.

As described later, the start node 130 transmits a start-up signal (radio signal) specifying a node address of the node 140 to be started so as to start up the node 140 to be started by using a near field communication transmission interface. The node to be started receives the start-up signal specifying its own node address and is then started up. A dotted circle 180A of FIG. 1 represents a start-up signal reaching range covered by the near field communication transmission interface of the start node 130. The reaching range of the start-up signal is limited by physical distance (e.g., limited to one meter or ten meters, etc.) depending on the specification of the near field communication used. As illustrated in FIG. 1, the node 140 to be started lies outside the reaching range of the start-up signal transmitted by the start node 130.

In the present embodiment, the start-up signal transmitted from the start node 130 is transmitted, through the start node side adapter 110, Ethernet 170, and node to be started side adapter 120, to the node 140 to be started so as to start up the node 140 to be started. That is, the start-up signal transmitted from the start node 130 is transmitted to the start node side adapter 110 lying within the start-up signal reaching range. Then, the start node side adapter 110 generates a power signal corresponding to a pattern of the start-up signal and transmits the generated power signal to the node to be started side adapter 120 by Ethernet with the PoE function. Subsequently, the node to be started side adapter 120 that has received the start-up power signal generates a start-up signal (signal having the same pattern as that of the start-up signal transmitted from the start node 130) corresponding to a pattern of the start-up power signal and transmits the generated start-up signal to the node 140 to be started through the near field communication transmission interface. As denoted by a dotted circle 180B of FIG. 1, the near field communication reception interface of the node 140 to be started lies within the start-up signal reaching range covered by the near field communication transmission interface of the node to be started side adapter 120. Thus, when the start-up signal specifying a node address of the node 140 to be started is transmitted from the near field communication transmission interface of the node to be started side adapter 120 to the node 140 to be started, the node 140 to be started is started up.

Figure 2B:
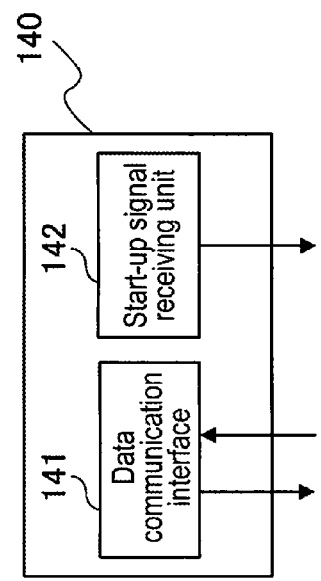
FIGS. 2A, 2B, 2C, and 2D are block diagrams illustrating configurations of nodes and switches in the communication system according to the first embodiment of the present invention.
Figure 2D:
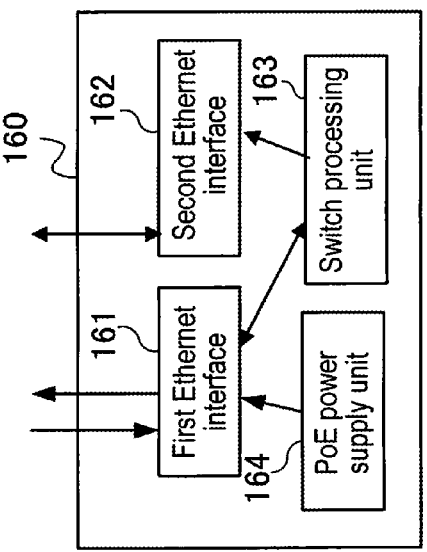
Figure 2A:
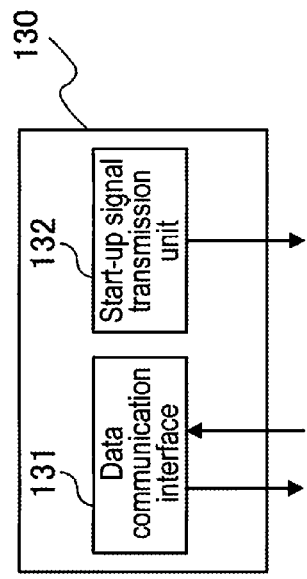

FIG. 2A is a block diagram schematically illustrating a configuration of the start node 130. The start node 130 is a node including a data communication interface 131 for data communication and a start-up signal transmission unit 132 which is a near field communication transmission interface for transmitting the start-up signal. The start node 130 uses the start-up signal transmission unit 132 to transmit the start-up signal (radio signal) specifying a node address of the node 140 to be started to the node 140 to be started through the start node side adapter 110 and node to be started side adapter 120, details of which will be described later, to thereby remotely start up the node 140 to be started.

Next, a configuration of the node 140 to be started will be described. FIG. 2B is a block diagram schematically illustrating a configuration of the node 140 to be started. The node 140 to be started is a node including a data communication interface 141 for data communication and a start-up signal reception unit 142 which is a near field communication reception interface for receiving the start-up signal (radio signal). The node 140 to be started receives the start-up signal from the start node 130 and detects it. When a node address specified by the start-up signal and its own node address coincide with each other, the node 140 to be started executes start-up processing for start-up (power-on). The start-up signal reception unit 142 has a high-sensitivity rectifier and uses this high-sensitivity rectifier to convert the received start-up signal into electric power, which is utilized for start instruction of initial start-up of the node 140 to be started. With such functions, the node 140 to be started does not consume the power of the start-up signal reception unit 142 in a standby state for waiting the start-up signal.

Figure 2C:
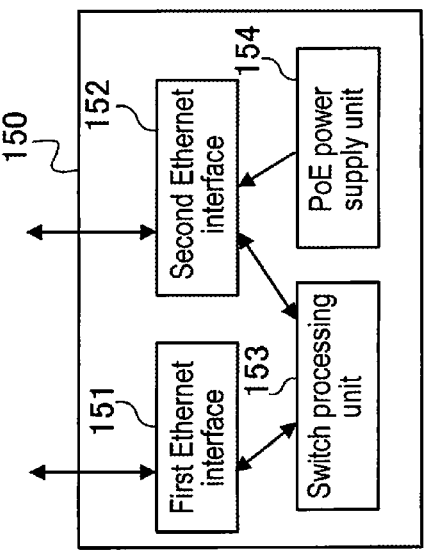

Next, the first switch 150 will be described. FIG. 2C is a block diagram schematically illustrating the first switch 150.

The first switch 150 performs data transfer processing between devices (including devices not-illustrated) connected thereto. For example, the first switch 150 performs data transfer processing between the start node 130 and start node side adapter 110.

A first Ethernet interface 151 exchanges data with devices (including devices not-illustrated) connected thereto. The first Ethernet interface 151 may be connected to the start node 130 or not-illustrated another node.

A PoE power supply unit 154 uses the PoE to supply power through a second Ethernet interface 152. Hereinafter, the power supplied or received using the PoE is referred to as "PoE power".

The second Ethernet interface 152 exchanges data with the start node side adapter 110 and transmits the PoE power through Ethernet.

A switch processing unit 153 performs control such that data received by the first Ethernet interface 151 is transferred using the second Ethernet interface 152. Alternatively, the switch processing unit 153 performs control such that data received by the second Ethernet interface 152 is transferred using the first Ethernet interface 151.

Next, a configuration of a second switch 160 will be described. FIG. 2D is a block diagram schematically illustrating a configuration of the second switch 160. The second switch 160 performs data transfer processing between devices (including devices not-illustrated) connected thereto. For example, the second switch 160 performs data transfer processing between the node 140 to be started and node to be started side adapter 120.

A first Ethernet interface 161 exchanges data with the node to be started side adapter 120 and transmits the PoE power to the node to be started side adapter 120 through Ethernet.

A PoE power supply unit 164 supplies the PoE power through the first Ethernet interface 161.

A second Ethernet interface 162 exchanges data with a node connected thereto. For example, the second Ethernet interface 162 may be connected to the node 140 to be started or not-illustrated another node.

A switch processing unit 163 performs control such that data received by the first Ethernet interface 161 is transferred using the second Ethernet interface 162. Alternatively, the switch processing unit 163 performs control such that data received by the second Ethernet interface 162 is transferred using the first Ethernet interface 161.

Figure 3:
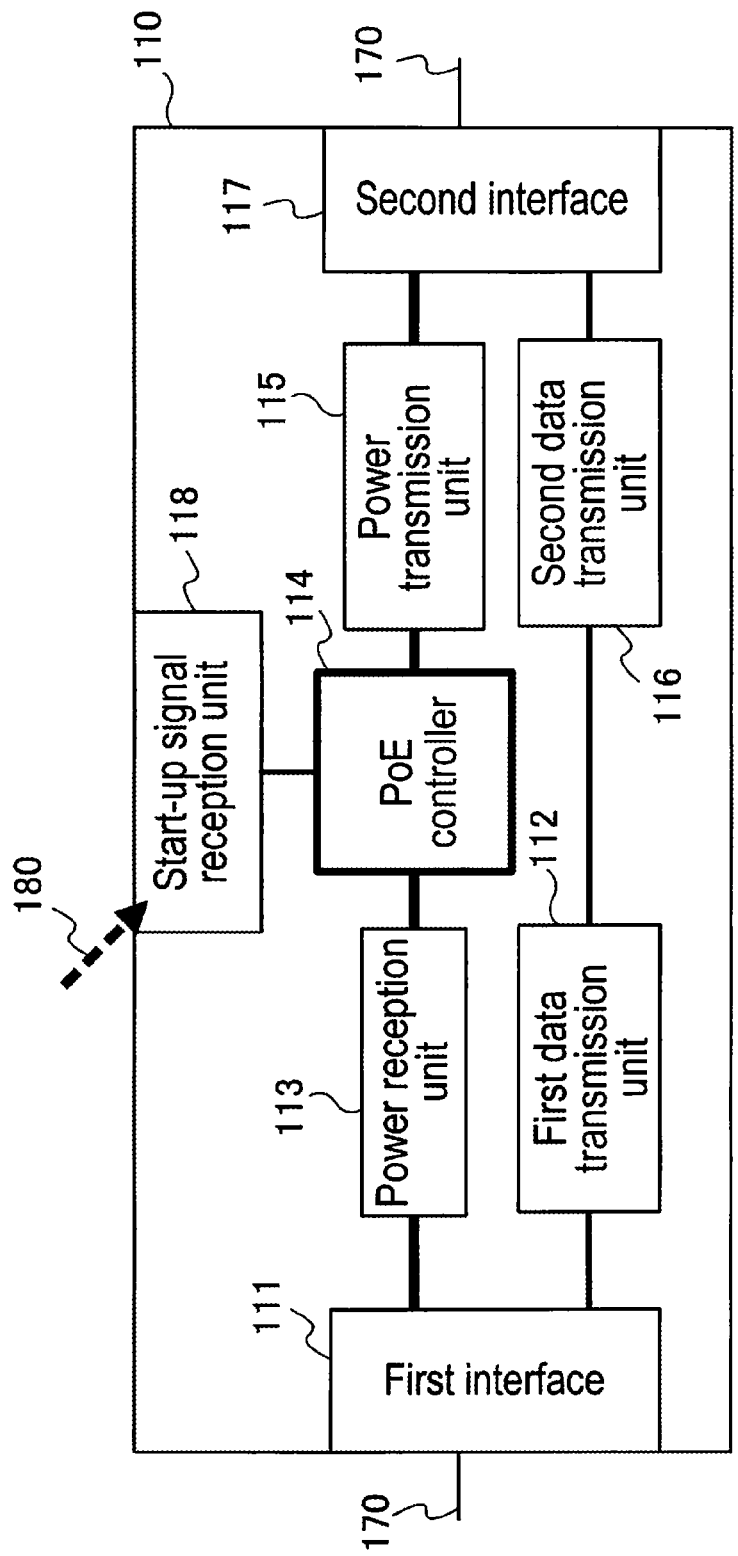
FIG. 3 is a block diagram illustrating a configuration of a start node side adapter according to the first embodiment of the present invention.

FIG. 3 is a block diagram illustrating a configuration of the start node side adapter 110 according to the first embodiment of the present invention.

A configuration of the start node side adapter 110 will be described.

A start-up signal reception unit 118 receives the start-up signal using the near field communication. When receiving the start-up signal, the start-up signal reception unit 118 notifies a PoE controller 114 of a signal pattern of the received start-up signal. The start-up signal reception unit 118 may have a high-sensitivity rectifier so as to convert the received start-up signal into electric power for starting up a part of or the entire start node side adapter 110.

A first interface 111 and a second interface 117 are communication interfaces directly connected to the first switch 150 and node to be started side adapter 120, respectively, through the Ethernet 170 so as to exchange data and PoE power.

A first data transmission unit 112 and a second data transmission unit 116 perform data exchange through the first interface 111 and second interface 117, respectively, so as to transfer data with the first switch 150 and node to be started side adapter 120 which are directly connected thereto. The above components are simply connected without any special processing, so that the data transfer can be accomplished even when the start node side adapter 110 is in a power-off state.

A power reception unit 113 has a PoE power receiving function (Powered Device) and receives the PoE power from the first switch 150.

The PoE controller 114 receives a pattern of the start-up signal from the start-up signal reception unit 118, as well as, receives the PoE power that the power reception unit 113 has received. Then, the PoE controller supplies power (hereinafter, referred to as "start-up power signal") having a value corresponding to a signal pattern (signal intensity, etc.) of the start-up signal to a power transmission unit 115. For example, the PoE controller 114 switches the PoE power (or value obtained by changing the value of the received PoE power) received by the power reception unit 113 between cases where the PoE controller 114 supplies or not the PoE power to the power transmission unit 115 depending on the signal pattern of the start-up signal. As a result, depending on the signal pattern of the start-up signal, the PoE controller 114 generates a start-up power signal having a pattern including 0 value and PoE power (or value obtained by changing the value of the received PoE power) received by the power reception unit 113. Alternatively, the PoE controller 114 changes the value of the power to be supplied to the power transmission unit 115 depending on the signal pattern of the start-up signal. As a result, the PoE controller 114 generates a start-up power signal having a pattern in which the power value has been changed depending on the signal pattern of the start-up signal.

The power transmission unit 115 has a PoE power supply function (PSE (Power Sourcing equipment)) and supplies the PoE power to the node to be started side adapter 120. For example, the power transmission unit 115 transmits the start-up power signal received from the PoE controller 114 to the node to be started side adapter 120.

Although not-illustrated, a management unit for managing the start node side adapter 110 or a power supply unit for operation of the above components may be provided.

Figure 4:
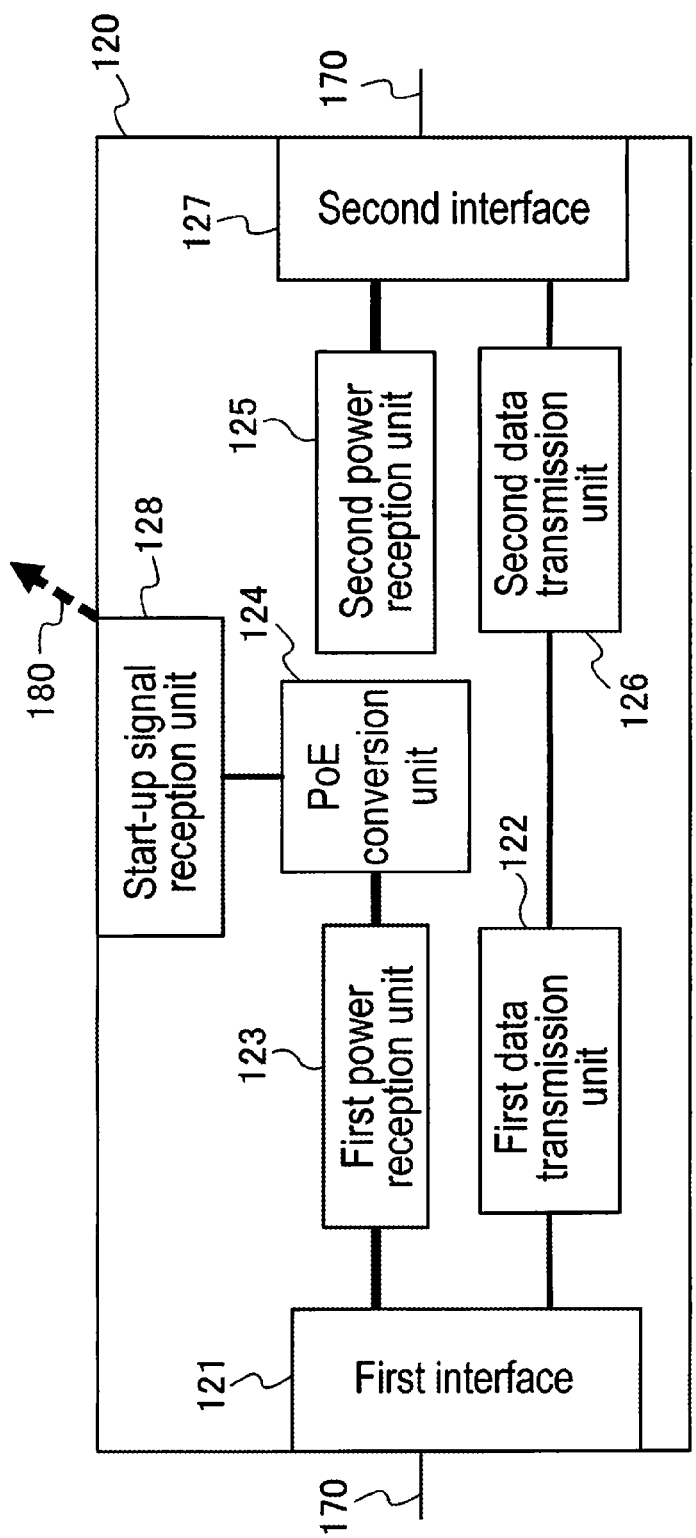
FIG. 4 is a block diagram illustrating a configuration of a node to be started side adapter according to the first embodiment of the present invention.

Next, with reference to FIG. 4, the node to be started side adapter 120 will be described. FIG. 4 is a block diagram illustrating a configuration of the node to be started side adapter 120 according to the first embodiment of the present invention. Now, the configuration of the node to be started side adapter 120 will be described.

A second interface 127 and a first interface 121 are communication interfaces directly connected to the second switch 160 and start node side adapter 110, respectively, through the Ethernet 170 so as to exchange data and PoE power.

A second data transmission unit 126 and a first data transmission unit 122 perform data exchange through the second interface 127 and first interface 121, respectively, so as to transfer data with the second switch 160 and start node side adapter 110 which are directly connected thereto. The above components are simply connected without any special processing, so that the data transfer can be accomplished even when the node to be started side adapter 120 is in a power-off state.

A second power reception unit 125 has a PoE power receiving function (PD (Powered Device)) and receives the PoE power from the second switch 160. The received PoE power may be utilized for operation of a start-up signal transmission unit 128 and a PoE conversion unit 124. Therefore, in the case where the power for operation of the start-up signal transmission unit 128 and PoE conversion unit 124 is not necessary, the second power reception unit 125 may be omitted (may be optionally provided).

A first power reception unit 123 has a PoE power receiving function (PD) and receives the PoE power (e.g., start-up power signal) from the start node side adapter 110. The received PoE power is supplied to the PoE conversion unit 124. Further, the received power may be utilized for operation of the start-up signal transmission unit 128 and PoE conversion unit 124.

The PoE conversion unit 124 receives the start-up power signal from the first power reception unit 123 and instructs the start-up signal transmission unit 128 to transmit a start-up signal of a signal pattern corresponding to the magnitude of the power of the start-up power signal. For example, the PoE conversion unit 124 gives an instruction of transmitting a start-up signal obtained by changing the signal intensity thereof depending on the magnitude of the power of the start-up power signal. Concretely, for example, the PoE conversion unit 124 designates a signal pattern of the start-up signal having high signal intensity for a large value of the received start-up power signal and low signal intensity for a small value of the received start-up power signal. Alternatively, the PoE conversion unit 124 designates a signal pattern of the start-up signal having a given intensity for the value of the received start-up power signal that is not smaller than a threshold value and another intensity for the value of the received start-up power signal that is not larger than a threshold value. The signal pattern of the start-up signal designated by the PoE conversion unit 124 is made identical to the signal pattern of the start-up signal transmitted by the start node 130.

The start-up signal transmission unit 128 transmits the start-up signal using the near field communication. Although the start-up signal is expressed by a radio signal pattern changing in chronological order, the start-up signal transmission unit 128 does not keep this pattern, but transmits the start-up signal of a signal pattern (change in the signal intensity or ON/OFF ("1" or "0")) designated by the PoE conversion unit 124.

Although not-illustrated, a management unit for managing the node to be started side adapter 120 or a power supply unit for operation of the above components may be provided.

Figure 5:
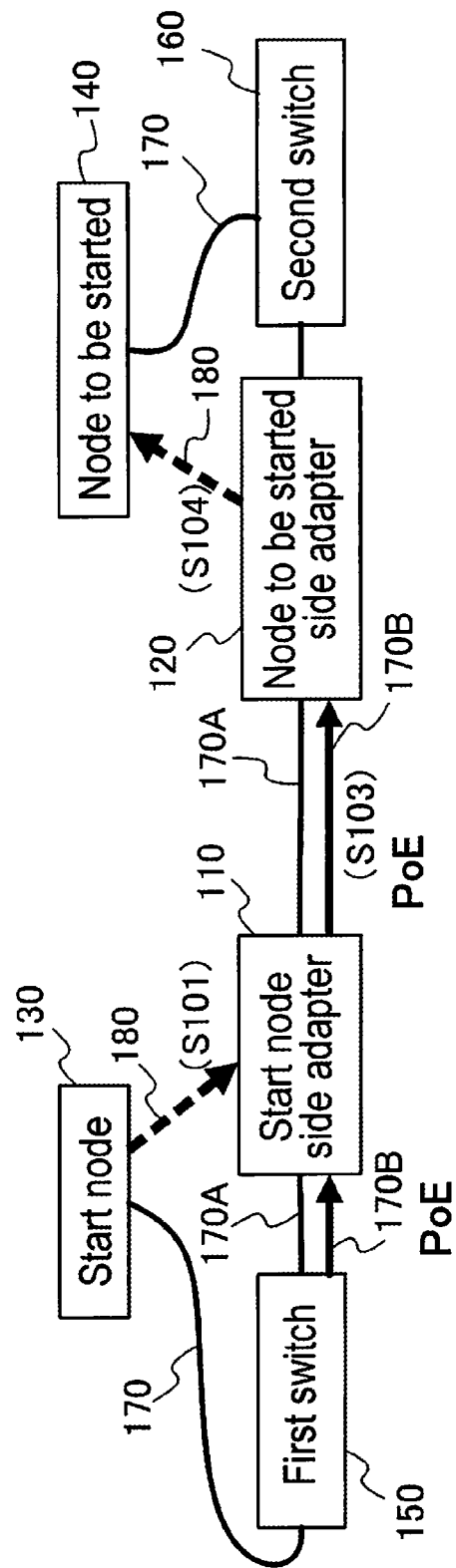
FIG. 5 is a view illustrating operation of the communication system according to the first embodiment of the present invention.
Figure 6:
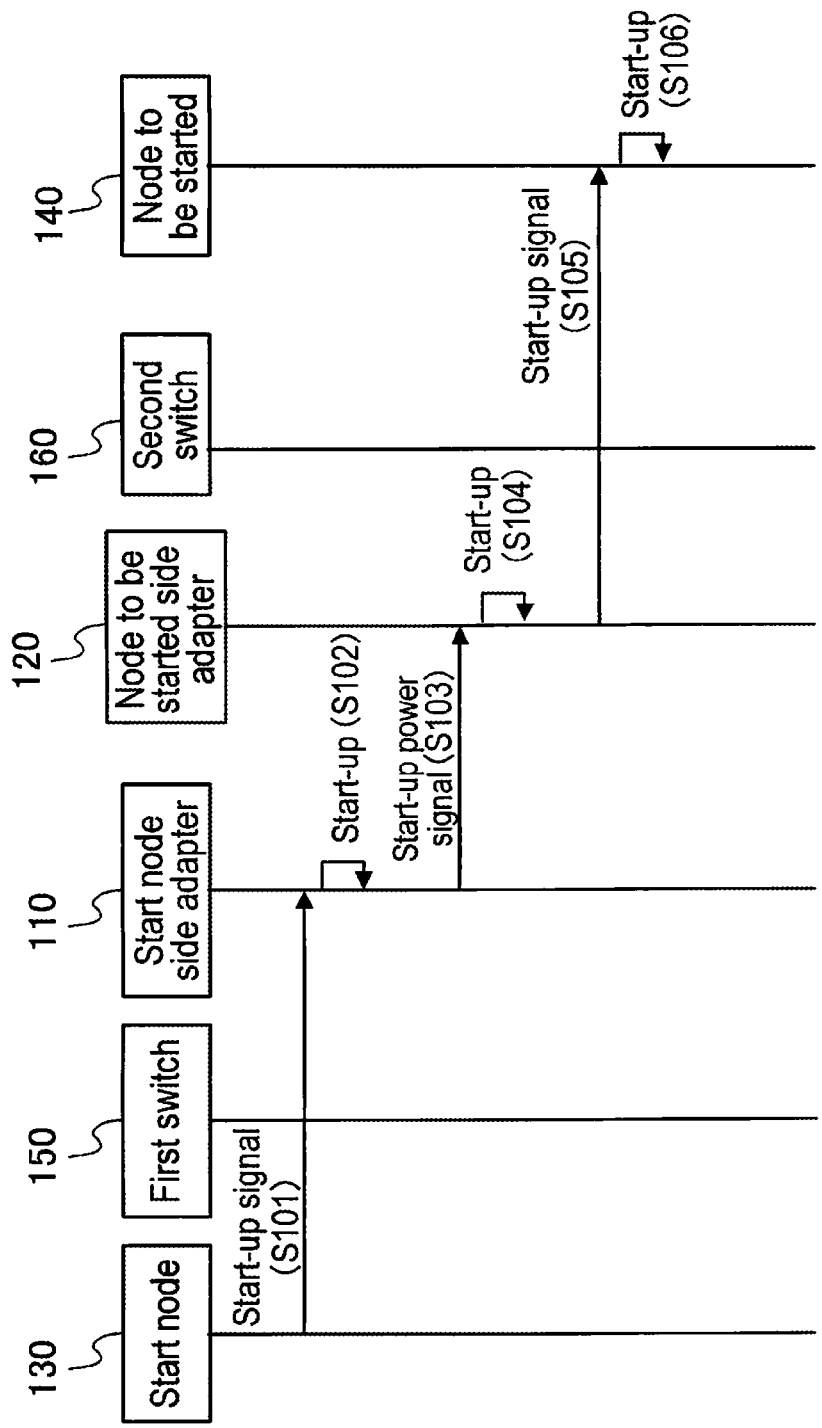
FIG. 6 is a sequence diagram illustrating operation of the communication system according to the first embodiment of the present invention.

FIG. 5 is a view illustrating operation of the communication system according to the first embodiment of the present invention. FIG. 6 is a sequence diagram illustrating operation of the communication system according to the first embodiment of the present invention. With reference to FIGS. 5 and 6, the outline of an operation sequence of the system according to the first embodiment of the present invention will be described.

In the operation sequence of the system according to the first embodiment of the present invention, the start node 130 transmits the start-up signal so as to start-up the node 140 to be started lying outside the start-up signal reaching range 180A of the start-up signal transmitted by the start node 130 while utilizing the start node side adapter 110 and node to be started side adapter 120.

First, states of the first switch 150, start node side adapter 110, node to be started side adapter 120, second switch 160, and node 140 to be started in the system initial state will be described.

In the initial state, the first switch 150 sets the PoE power supply function (PSE) for the start node side adapter 110 in an enabled state. On the other hand, the start node side adapter 110 does not set the PoE power receiving function (PD) in an enabled state. In this state, the first switch 150 does not supply power to the start node side adapter 110.

In the initial state, the start node side adapter 110 does not set the PoE power reception receiving (PD) in an enabled state. That is, this is a state where the start node side adapter 110 has a function of performing only data transfer between the first switch 150 and node to be started side adapter 120, i.e., a state where an Ethernet cable is simply connected. That is, in this state, the start node side adapter 110 does not consume power. Note that, in the initial state, the start node side adapter 110 may set the PoE power receiving function (PD) in an enabled state. In this case, the start node side adapter 110 may receive power, which is fed by the PSE function of the first switch 150, using the PoE power receiving function (PD) and start up the short-distance radio reception interface (start-up signal reception unit 118).

In the initial state, the node to be started side adapter 120 is in a state where it performs only data transfer between the start node side adapter 110 and second switch 160. This is a state where an Ethernet cable is simply connected, and the node to be started side adapter 120 does not consume power. The PoE power receiving function (PD) in the communication interface on the side connected to the start node side adapter 110 is in an enabled state. However, in the initial state, power is not supplied from the start node side adapter 110 by the PoE. Thus, the node to be started side adapter 120 is not started up and thus does not consume power. Note that, in the initial state, the node to be started side adapter 120 may set the PoE power receiving function in the communication interface on the side connected to the second switch 160 in an enabled state. In this case, when the power supply function (PSE) in the interface of the second switch 160 is in an enabled state, the start node side adapter 110 can receive power using the PoE power receiving function (PD) in the communication interface directly connected to the switch.

Further, in the initial state, the second switch 160 may set the PoE power supply function (PSE) for the node to be started side adapter 120 in an enabled state or not.

Further, in the initial state, the node 140 to be started is in a power-off state.

Next, operation of the system after the initial state will be described.

First, the start node 130 transmits a start-up signal specifying a node address of the node 140 to be started from the start-up signal transmission unit 132 (S101). The start-up signal is expressed by a radio signal pattern (e.g., digital ("1" or "0") pattern) changing in chronological order. For example, the radio signal pattern is expressed by the signal intensity.

The transmitted start-up signal is received by the start-up signal reception unit 118 of the start node side adapter 110. Upon receiving the start-up signal, the start node side adapter 110 uses the high-sensitivity rectifier to convert the start-up signal into power for start-up (S102). At this time, the PoE power receiving function (PD) in the start node side adapter 110 is enabled. When the PoE power receiving function (PD) is enabled, the start node side adapter 110 receives power from the first switch 150 by the PoE. Then, the start node side adapter 110 generates a start-up power signal which is power having a value corresponding to a signal pattern of the received start-up signal and transmits the generated start-up power signal to the node to be started side adapter 120 using the power supply function (PSE) (S103).

The start-up power signal is set so as to have a pattern having a given value (for example, power received by the first power reception unit 123 is transmitted without change) for high signal intensity of the start-up signal and 0 (i.e., power is not transmitted) for low signal intensity of the received start-up signal. Alternatively, the start-up power signal may have a signal pattern in which the power value is made to change such that it represents high power (transmission voltage) for high signal intensity while represents small power (transmission voltage) for low signal intensity. Further alternatively, the start-up power signal may have a signal pattern in which the power value is made to change such that it represents power (transmission voltage) of a given value for signal intensity not lower than a threshold value while represents power (transmission voltage) of another value for signal intensity not higher than a threshold value.

Then, the node to be started side adapter 120 is started up by the start-up power signal transmitted from the start node side adapter 110 (S104). Alternatively, the node to be started side adapter 120 may be previously started up by the PoE supplied from the second switch 160. In this case, processing of S104 is skipped.

Then, the node to be started side adapter 120 generates a start-up signal of a pattern corresponding to the pattern (magnitude) of the power (voltage) of the received start-up power signal and transmits the generated start-up signal from the start-up signal transmission unit 128 (S105).

For example, when the received start-up power signal is a signal of a pattern having power values of a given value and 0, the start-up signal is set to be a radio signal having high signal intensity for the power of a given value and low signal intensity for the power of 0. When the received start-up power signal is a signal pattern in which the power value is made to change between high and low values, the start-up signal is set to be a radio signal having high signal intensity for high power (reception voltage) and low signal intensity for low power (reception voltage). Further, when the received start-up power signal is a signal pattern in which the power value is made to change between power (reception voltage) having a value not smaller than a threshold value and a power (reception voltage) having a value not larger than a threshold value, the start-up signal is set to be a radio signal having signal intensity of a given value for the power (reception voltage) not lower than the threshold value and signal intensity of another value for the power (reception voltage) not higher than the threshold value. The signal pattern of the start-up signal transmitted by the node to be started side adapter 120 is made identical to the signal pattern of the start-up signal transmitted by the start node 130.

The node 140 to be started receives the start-up signal and is then started up after detecting that the node address included in the signal coincides with its own node address (S106).

Next, details of the operations of the start node side adapter 110 and node to be started side adapter 120 will be described with reference to FIGS. 7 to 12. As the operation of the start node side adapter 110, operation of receiving the start-up signal, converting the start-up signal into a start-up power signal based on the signal pattern of the start-up signal, and transmitting the start-up power signal to the node to be started side adapter 120 will be described. As the operation of the node to be started side adapter 120, operation of receiving the start-up power signal and transmitting the start-up power signal based on the pattern thereof will be described.

Figure 7:
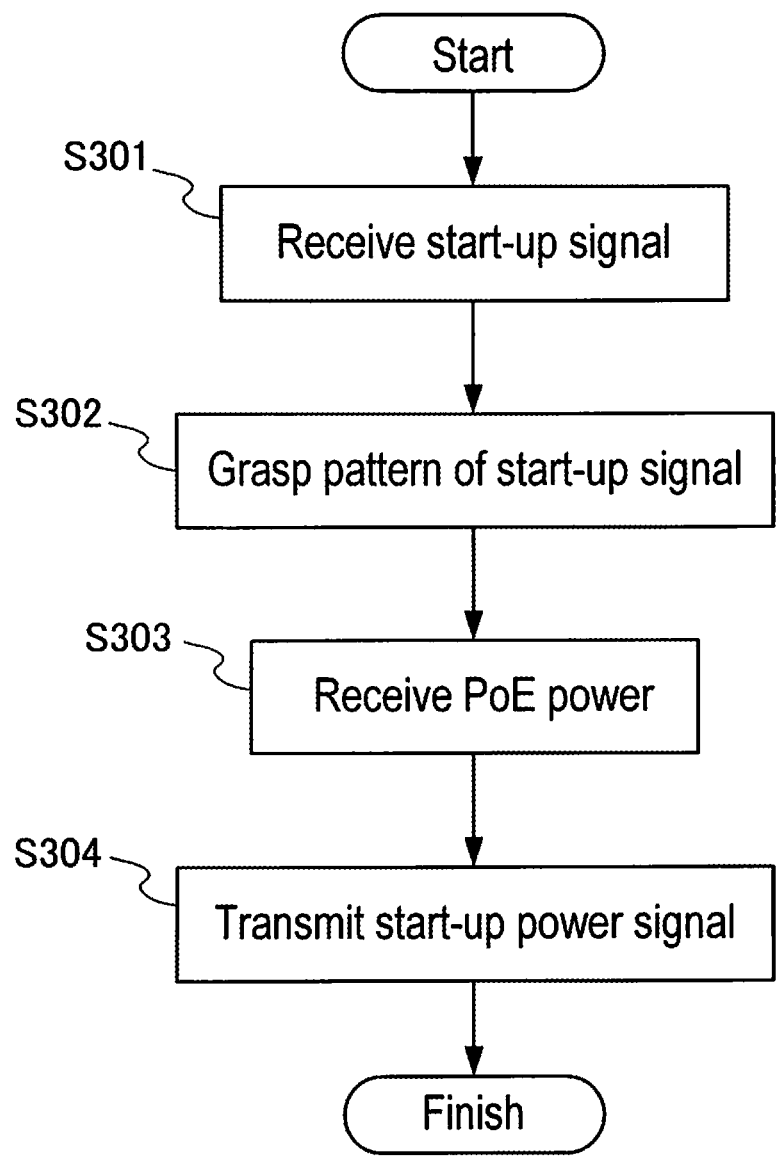
FIG. 7 is a flowchart illustrating operation of the start node side adapter according to the first embodiment of the present invention.
Figure 8:
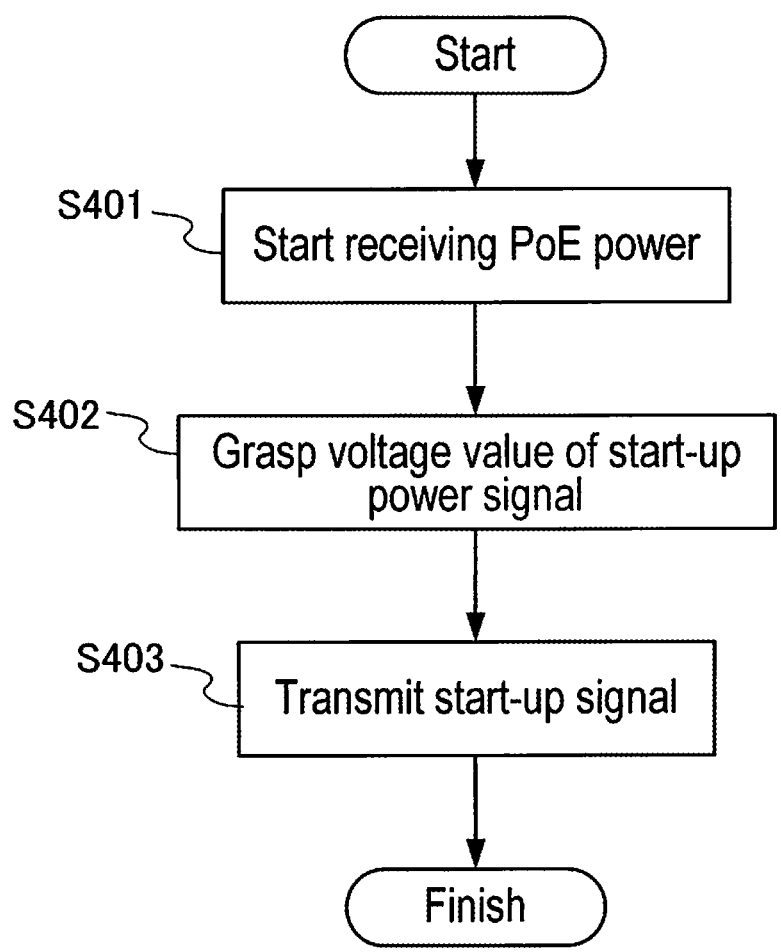
FIG. 8 is a flowchart illustrating operation of the node to be started side adapter according to the first embodiment of the present invention.
Figure 10:
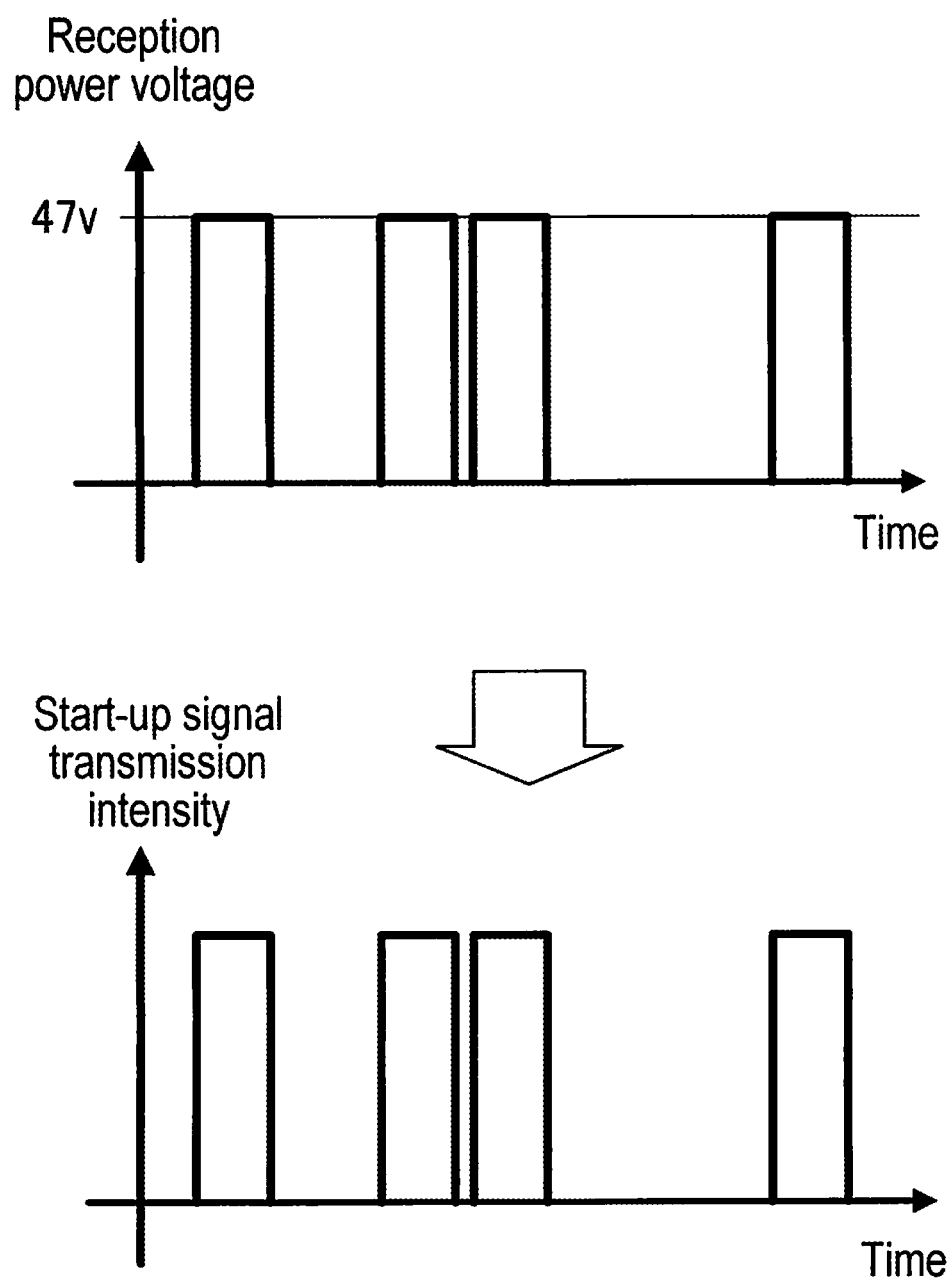
FIG. 10 is a view illustrating a first example of the correspondence relationship between the intensity of the start-up power signal received by the node to be started side adapter 120 of FIG. 5 and transmission intensity of the start-up signal.
Figure 12:
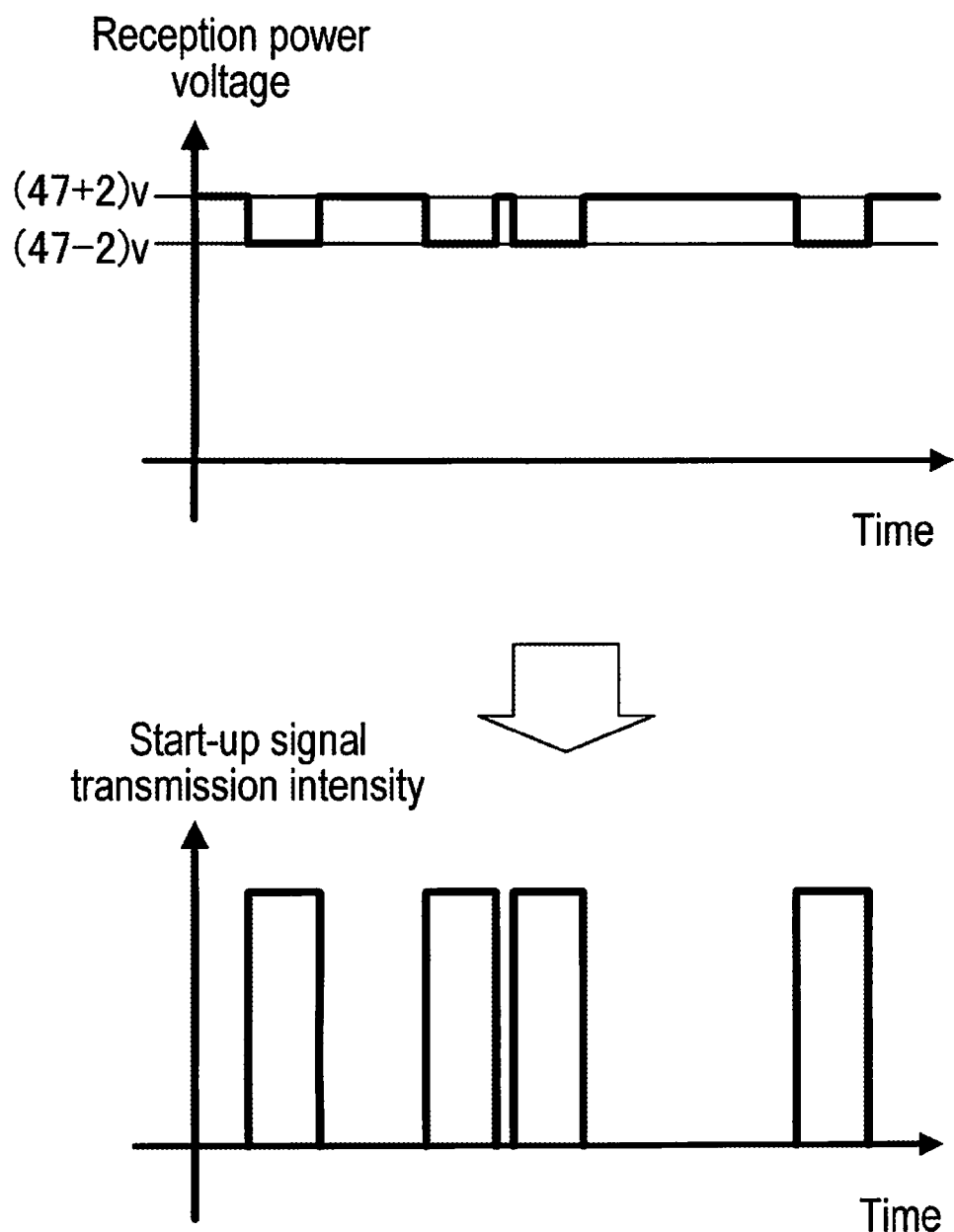
FIG. 12 is a view illustrating a second example of the correspondence relationship between the intensity of the (start-up?) power signal received by the node to be started side adapter 120 of FIG. 5 and transmission intensity of the start-up signal.

FIG. 7 is a flowchart illustrating operation of the start node side adapter 110 according to the first embodiment of the present invention. FIG. 8 is a flowchart illustrating operation of the node to be started side adapter 120 according to the first embodiment of the present invention. FIG. 9 is a view illustrating a first example of the correspondence relationship between the reception signal intensity of the start-up signal in the start node side adapter 110 and voltage value of the start-up power signal. FIG. 10 is a view illustrating a first example of the correspondence relationship between the voltage value of the start-up power signal received by the node to be started side adapter 120 and transmission intensity of the start-up signal. FIG. 11 is a view illustrating a second example of the correspondence relationship between the reception signal intensity of the start-up signal in the start node side adapter 110 and voltage value of the start-up power signal. FIG. 12 is a view illustrating a second example of the correspondence relationship between the intensity of the start-up power signal received by the node to be started side adapter 120 and transmission intensity of the start-up signal.

First, as illustrated in FIG. 7, the start-up signal reception unit 118 of the start node side adapter 110 receives a start-up signal (S301). The start node side adapter 110 can acquire power for instructing initial start-up by using a method of converting the start-up signal received by the start-up signal reception unit 118 into electric power by means of the high-sensitivity rectifier. Alternatively, the start node side adapter 110 may turn on the PoE power receiving function (PD) in the power reception unit 113 in the wake of reception of the start-up signal and acquire the minimum power required for start-up signal reception using the power (PoE) supplied from the first switch 150 so as to receive the start-up signal. In either case, the start node side adapter 110 can acquire power for start-up signal reception in the wake of reception of the start-up signal, eliminating the need to provide a power supply for the start node side adapter 110 by itself, so that the start node side adapter 110 need not consume power in a standby state.

At this time, it is assumed that the power reception unit 113 sets the PoE power receiving function (PD) in an enabled state and is ready for receiving supply of the PoE power from the first switch 150. Although the power reception unit 113 has not yet started receiving the power in the present invention, the power reception unit 113 may start receiving the power at this time point.

Upon reception of the start-up signal, the start-up signal reception unit 118 notifies the PoE controller 114 of a pattern of the received start-up signal (S302). Further, the start-up signal reception unit 118 instructs the power reception unit 113 to enable the PoE power receiving function (PD) (S303). At the same time, the start-up signal reception unit 118 gives an instruction of start-up of the PoE controller 114.

A configuration may be possible in which the start node side adapter 110 is not activated when the reception intensity of the start-up signal is not higher than a given threshold value and it returns to the initial state when the reception intensity becomes lower than the threshold value after the start of reception of the start-up signal. This allows the start node side adapter 110 not to have a state at all and allows saving of power consumed when the start-up signal to be notified is "0".

Upon reception of the PoE power from the power reception unit 113 (S302) and notification of the pattern of the start-up signal from the start-up signal reception unit 118 (S303), the PoE controller 114 gives a transmission instruction of a start-up power signal which is power having a pattern corresponding to the pattern of the start-up signal to the power transmission unit 115 having the PSE function.

A first example of conversion between the patterns of the start-up signal and start-up power signal is illustrated in FIG. 9.

The pattern of the start-up power signal is set for the start-up signal of a pattern having signal intensities of a given value and 0 such that a voltage of 47 V is set for signal intensity of a given value (not 0) and a voltage of 0 is set for signal intensity of 0. This conversion can be achieved by executing a conversion in which power is set to a given value for signal intensity of the start-up signal not lower than a given threshold value and to 0 for signal intensity not higher than a given threshold value. In this case, the PoE controller 114 switches the power value between cases where the PoE controller 114 supplies or not the power (or value obtained by changing the value of the received power) of the start-up power signal transmitted from the first power reception unit 113 to the power transmission unit 115.

A second example of conversion between the patterns of the start-up signal and start-up power signal is illustrated in FIG. 11.

The pattern of the start-up power signal is set for the start-up signal of a pattern having signal intensities of a given value and 0 such that a voltage of 45 V is set for signal intensity of a given value (not 0) and a voltage of 49 V is set for signal intensity of 0. This conversion can be achieved by executing a conversion in which power is set to a given value for signal intensity of the start-up signal not lower than a given threshold value and to another value for signal intensity not higher than a given threshold value. In this case, the PoE controller 114 changes the power of the start-up signal transmitted from the power reception unit 113 so as to supply power of different values to the power transmission unit 115.

Further, although not-illustrated, as a third example of conversion between the patterns of the start-up signal and start-up power signal, a method may be possible in which an analog value is used as the value of the signal intensity of the start-up signal, and power obtained by mapping the analog value without change is transmitted as the power value of the start-up power signal.

Next, upon reception of the instruction of starting the transmission of the start-up power signal from the PoE controller 114, the power transmission unit 115 supplies, using the PoE power transmission function (PSE) the start-up power signal to the node to be started side adapter 120 through the second interface 117 (S304).

Next, with reference to FIG. 8, operation of the node to be started side adapter 120 will be described.

As illustrated in FIG. 8, the node to be started side adapter 120 receives the PoE power through the first interface 121 using the PD function in the first power reception unit 123 (S401) to start start-up operation. Thus, a power supply need not be provided for the node to be started side adapter 120 by itself.

In receiving the PoE power using the PD function in the first power reception unit 123, the node to be started side adapter 120 may receive only power of the start-up power signal or may receive supply of power required for the node to be started side adapter 120 itself to operate in addition to the power of the start-up power signal. Further, the node to be started side adapter 120 can receive supply of power required for the node to be started side adapter 120 itself to operate from the second switch 160 using the second power reception unit 125.

After starting reception of the power using the PD function in the first power reception unit 123 and receiving the start-up power signal, the node to be started side adapter 120 notifies the PoE conversion unit 124 of information of the power (voltage value) of the start-up power signal (S402). Further, at this time, the first power reception unit 123 instructs start-up of the PoE conversion unit 124.

A configuration may be possible in which the node to be started side adapter 120 is not activated when the received power is not higher than a given threshold value and it returns to the initial state when the receive power becomes lower than the threshold value after the start of reception of the start-up signal. This allows the node to be started side adapter 120 not to have a state at all and allows saving of power consumed when the start-up signal to be notified is "0".

The PoE conversion unit 124 determines a signal pattern of the start-up signal to be transmitted to the start-up signal transmission unit 128 depending on the power (voltage value) of the start-up power signal notified from the first power reception unit 123.

A first example of conversion between the patterns of the start-up power signal and start-up signal is illustrated in FIG. 10.

The pattern of the start-up signal is set for the start-up power signal of a pattern having voltage values of 47 V and 0 V such that a signal intensity of a given value is set for the voltage value of 47 V and a signal intensity of 0 is set for the voltage value of 0 V. This conversion can be achieved by executing a conversion in which the signal intensity is set to a given value for signal intensity of the start-up power signal not lower than a given threshold value and to 0 for signal intensity not higher than a given threshold value. In this case, the PoE conversion unit 124 instructs the start-up signal transmission unit 128 to switch between a case where a signal of given signal intensity is transmitted and a case where transmission operation is stopped.

A second example of conversion between the patterns of the start-up power signal and start-up signal is illustrated in FIG. 12.

The pattern of the start-up signal is set for the start-up power signal of a pattern having voltage values of 49 V and 45 V such that a signal intensity of 0 is set for the voltage value of 49 V and a signal intensity of a given value is set for the voltage value of 45 V. This conversion can be achieved by executing a conversion in which the signal intensity is set to a given value for signal intensity of the start-up power signal not lower than a given threshold value and to another value for signal intensity not higher than a given threshold value. In this case, the PoE conversion unit 124 instructs the start-up signal transmission unit 128 to switch between a case where a signal of given signal intensity is transmitted and a case where a signal of another signal intensity is transmitted.

Further, although not-illustrated, as a third example of conversion between the patterns of the start-up signal and start-up power signal, a method may be possible in which an analog value is used as the power value of the start-up power signal and mapped without change to the transmission signal intensity of the start-up signal.

Then, upon reception of a start-up signal transmission start instruction including the pattern of the start-up signal from the PoE conversion unit 124, the start-up signal transmission unit 128 transmits the start-up signal (radio signal) in the designated pattern (S403). The pattern of the start-up signal (radio signal) transmitted at this time is made identical to the pattern of the start-up signal received by the start node side adapter 110 remotely connected through the Ethernet 170. In order to make the pattern of the start-up signal identical, the following approaches are used. For example, when the PoE controller 114 of the start node side adapter 110 converts the start-up signal by using the conversion method of FIG. 9 to generate the start-up power signal, the PoE conversion unit 124 of the node to be started side adapter 120 converts the start-up power signal by using the conversion method of FIG. 10 to generate the signal pattern of the start-up signal. For example, when the PoE controller 114 of the start node side adapter 110 converts the start-up signal by using the conversion method of FIG. 11 to generate the start-up power signal, the PoE conversion unit 124 of the node to be started side adapter 120 converts the start-up power signal by using the conversion method of FIG. 12 to generate the signal pattern of the start-up signal. That is, the conversion method from the start-up signal to start-up power signal is made corresponding to the conversion method from the start-up power signal to start-up signal, like a combination of FIGS. 9 and 10 or combination of FIGS. 11 and 12.

According to the start node side adapter 110 and node to be started side adapter 120 of the first embodiment, when the start node 130 uses the near field communication system to remotely start up the node 140 to be started, it is possible to overcome the restriction on the physical distance between the start node 130 and node 140 to be started to thereby remotely start up the node 140 to be started lying outside the near field communication reaching range, as well as, to reduce standby power consumption of the node 140 to be started.

Further, according to the start node side adapter 110 and node to be started side adapter 120 of the first embodiment of the present invention, the above advantages can be obtained simply by adding the start node side adapter 110 and node to be started side adapter 120 to an existing network environment (system constituted by the start node 130, node 140 to be started, first switch 150, second switch 160, and the like). Thus, it is possible to easily expand the start-up signal reaching range at low cost without significantly changing an existing network environment.

Next, some modifications of the first embodiment of the present invention will be described.

<First Modification>

In the first embodiment, the start node side adapter 110 generates, under the control of the PoE controller 114, the start-up power signal in which the power value is made different depending on the reception intensity of the start-up signal. However, the start node side adapter 110 may be a device that repeats operation and stop to generate the start-up power signal having power of a given value and 0. That is, a configuration may be possible in which the start node side adapter 110 returns to the initial state when the reception signal intensity becomes lower than a start-up signal reception intensity threshold value after the start of reception of the start-up signal while transmits power of a given value when the reception intensity of the start-up signal exceeds the start-up signal reception intensity threshold value. This allows the start node side adapter 110 to have only a function of transmitting power of a given value at the operation time. Further, since the operation of the start node side adapter 110 is stopped when the start-up signal to be notified is "0", power consumption can be saved.

Further, the node to be started side adapter 120 generates, under the control of the PoE conversion unit 124, the start-up signal in which the signal intensity is made different depending on the power value of the start-up power signal. However, the node to be started side adapter 120 may be a device that repeats operation and stop to generate the start-up signal having given signal intensity and 0. That is, a configuration may be possible in which the node to be started side adapter 120 returns to the initial state when the power of the start-up power signal is not higher than a given threshold value after the start of reception of the start-up power signal while transmits a signal of a given value when the power of the start-up power signal exceeds a threshold value. This allows the node to be started side adapter 120 to have only a function of transmitting a signal of a given value at the operation time. Further, since the operation of the node to be started side adapter 120 is stopped when the start-up signal to be notified is "0", power consumption can be saved. The present modification is intended for complementing the content that has already been described in the first embodiment.

<Second Modification>

The start node side adapter 110 and node to be started side adapter 120 of the system according to a second modification of the first embodiment differ from those of the system according to the first embodiment in the following points. That is, the node to be started side adapter 120 of the second modification is classified as CLASS 4 (reservation), and the start node side adapter 110 of the second modification executes a DETECTION phase and a CLASSIFICATION phase before transmitting the start-up power signal so as to confirm whether the PD of a device which is a transmission destination of the start-up power signal is CLASS 4 and transmits the start-up power signal only when the PD of the transmission destination device is CLASS 4. The devices other than the node to be started side adapter 120 are classified as categories other than CLASS 4.

Hereinafter, the reason for employing the above configuration will be described.

Unlike a typical PoE, the PoE that the start node side adapter 110 uses in transmission of the start-up power signal temporally changes its voltage value and gives meaning to the change. Thus, a device to which the start node side adapter 110 transmits the start-up power signal needs to be able to receive and detect such a POE in which the voltage value temporally changes. On the other hand, there is no connectivity between the start node side adapter 110 and devices other than such a device. Therefore, in the present modification, if the start node side adapter 110 is erroneously connected to a device that does not deal with the change in the voltage value of the PoE, the following approach can be taken. That is, the start node side adapter 110 of the second modification executes a DETECTION phase and a CLASSIFICATION phase specified in the PoE before transmitting the start-up power signal (or at the time of connection between the start node side adapter 110 and device). Then, the start node side adapter 110 determines whether the PD of the connection destination device can deal with the change in the voltage value of the PoE depending on whether the connection destination device is CLASS 4. The start node side adapter 110 transmits the start-up power signal when the PD of the connection destination device can deal with the change, while does not transmit the signal when the PD of the device cannot deal with it.

Operation of the system according to present modification will be described.

The start node side adapter 110 executes a DETECTION phase and a CLASSIFICATION phase before connecting to a given device (or before transmitting the start-up power signal). For example, in the CLASSIFICATION phase, the start node side adapter 110 applies certain voltage for a given time period to perform classification of the PDs of the connected devices based on the value of the current flowing therein. When the measured current value is in the range of 35 mA to 45 mA, the start node side adapter 110 determines that the PD of the connected device is CLASS 4. On the other hand, when the measured current value falls outside the range of 35 mA to 45 mA, the start node side adapter 110 determines that the PD of the connected device is not CLASS 4. As described above, the start node side adapter 110 classifies the node to be started side adapter 120 (device that can deal with the change in the voltage value of the PoE) as CLASS 4 and classifies devices other than the node to be started side adapter 120 as categories other than CLASS 4. Thus, when the start node side adapter 110 has determined that the PD of the connected device is CLASS 4, which means that the connected device is a device (i.e., node to be started side adapter 120) that can deal with the change in the voltage value of the PoE, so the start node side adapter 110 transmits the start-up power signal. On the other hand, when the start node side adapter 110 has determined that the PD of the connected device is not CLASS 4, which means that the connected device is not a device (i.e., node to be started side adapter 120) that can deal with the change in the voltage value of the PoE, so the start node side adapter 110 does not transmit the start-up power signal.

As described above, according to the node to be started side adapter 120 of the present modification, even if the start node side adapter 110 is erroneously connected to a device that cannot deal with the change in the voltage value of the PoE, it is possible to prevent the start node side adapter 110 from transmitting the start-up power signal, thereby preventing a connected device from breaking down.

It is not limited that the started side adapter 120 is classified as class4. That is to say, the started side adapter 120 may be classified as a class which apparatuses are classified, the apparatuses being other than the started side adapter 120 in the system of the second modification.

<Third Modification>

The system according to a third modification of the first embodiment will be described.

In the third modification, four methods for the node to be started side adapter 120 to achieve stable operation when receiving the start-up power signal will be described.

In the system according to the first embodiment, the start node side adapter 110 transmits the start-up power signal obtained by converting the signal pattern of the start-up signal into the PoE power (voltage) to the node to be started side adapter 120. That is, unlike conventional PoE power which is constant, the PoE power changes in the present embodiment. In the present modification, methods for the node to be started side adapter 120 that receives the start-up power signal to achieve stable operation even when the start-up power signal in which the PoE power changes is used will be described.

A first method is to reduce the bit rate of the start-up signal that the start node 130 transmits to a level at which the node to be started side adapter 120 can stably operate. More concretely, the first method is to reduce the bit rate to a level at which the node to be started side adapter 120 that has received the start-up power signal generated in accordance with the pattern of the start-up signal can stably operate. For example, in the case where a signal in which "0" and "1" are alternately repeated at a high bit rate is used as the start-up signal, the node to be started side adapter 120 that receives the start-up power signal obtained by converting this pattern may require time for stabilizing the PoE power. In order to prevent this, it is preferable to control the bit rate of the start-up signal.

A second method is to previously supply the PoE power from the first switch 150 to the start node side adapter 110 using the Ethernet 170 before transmission of the start-up signal by the start node 130 or to previously supply the PoE power from the second switch 160 to node to be started side adapter 120 using the Ethernet 170 before the transmission of the start-up signal. It is preferable for the PoE power to supply power for the start node side adapter 110 and node to be started side adapter 120 to stably operate to achieve voltage stable states of the start node side adapter 110 and node to be started side adapter 120 in their initial states.

A third method is to supply power to the node to be started side adapter 120 with voltage serving as preamble added thereto before transmission of the start-up power signal from the start node side adapter 110 to node to be started side adapter 120. As the voltage serving as preamble, voltage allowing the node to be started side adapter 120 to stably operate before receiving the start-up power signal and capable of supplying power sufficient to complete transmission of the start-up signal having a certain length. The present modification is intended for complementing the content that has already been described in the first embodiment.

A fourth method is that when transmitting the start-up power signal, the start node side adapter 110 converts information expressed by "0" and "1" in the start-up signal into change in the voltage value. That is, the start node side adapter 110 does not perform operation such that it transmits power when the start-up signal indicates "1" while does not transmit power when the start-up signal indicates "0", but continues transmitting power irrespective of whether the start-up signal indicates "0" or "1". More in detail, with a given reference voltage value (e.g., 47 V) set as a reference, the start-up power signal is generated by mapping information of "start-up signal="1"" to "reference voltage value+2 V (49 V)" and information of "start-up signal="0"" to "reference voltage value−2 V (45 V)". In the PoE, a difference of ±2 V is allowed even when a voltage of 47 V is applied. Therefore, by mapping the information of "start-up signal="1"" to 49 V and information of "start-up signal="0"" to 45 V, the start node side adapter 110 and node to be started side adapter 120 can be kept at an ON state, thereby avoiding operational instability due to repetition of ON/OFF. The present modification is intended for complementing the content that has already been described in the first embodiment.

<Fourth Modification>

Next, the system according to a fourth modification of the first embodiment will be described.

The system of the fourth modification includes a start node side switch 2150 having the function of the start node side adapter 110 and a node to be started side switch 2160 having the function of node to be started side adapter 120.

Figure 13:
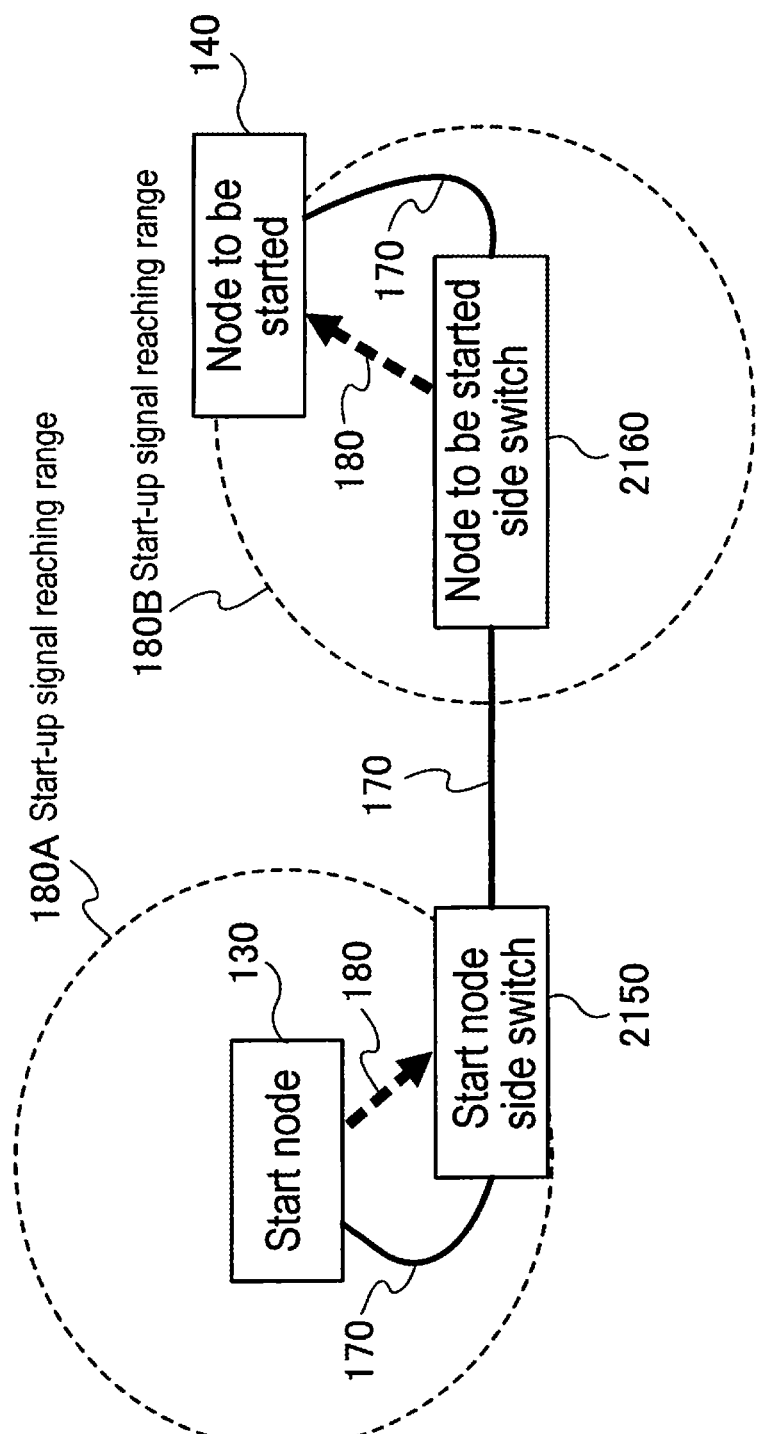
FIG. 13 is a view illustrating a configuration of a communication system according to a fourth modification of the first embodiment of the present invention.

As illustrated in FIG. 13, the system according to the fourth modification of the first embodiment includes the start node 130, start node side switch 2150, node to be started side switch 2160, and node 140 to be started. The start node side switch 2150 and node to be started side switch 2160 are connected by the Ethernet 170. The start node 130 and start node side switch 2150 may be connected by the Ethernet 170 or the like, as well as, the node to be started side switch 2160 and node 140 to be started may be connected by the Ethernet 170 or the like so as to allow the start node 130 and node 140 to be started to communicate with each other through a network. The start node side switch 2150 lies within the reaching range 180A of the start-up signal transmitted by the start node 130, and the node 140 to be started lies within the reaching range 180B of the start-up signal transmitted by the node to be started side switch 2160.

Figure 14:
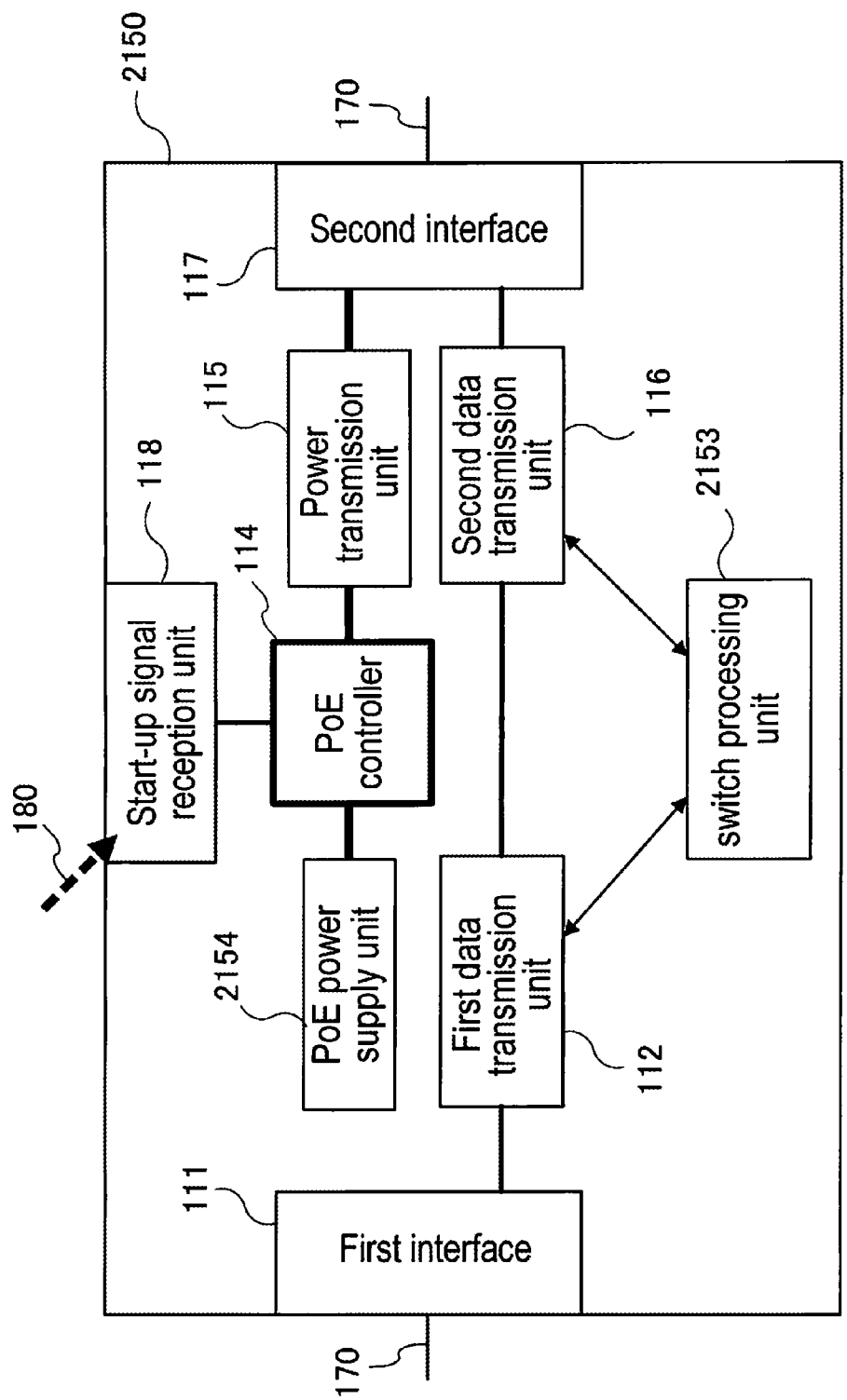
FIG. 14 is a block diagram of a start node side switch according to the fourth modification of the first embodiment of the present invention.
Figure 15:
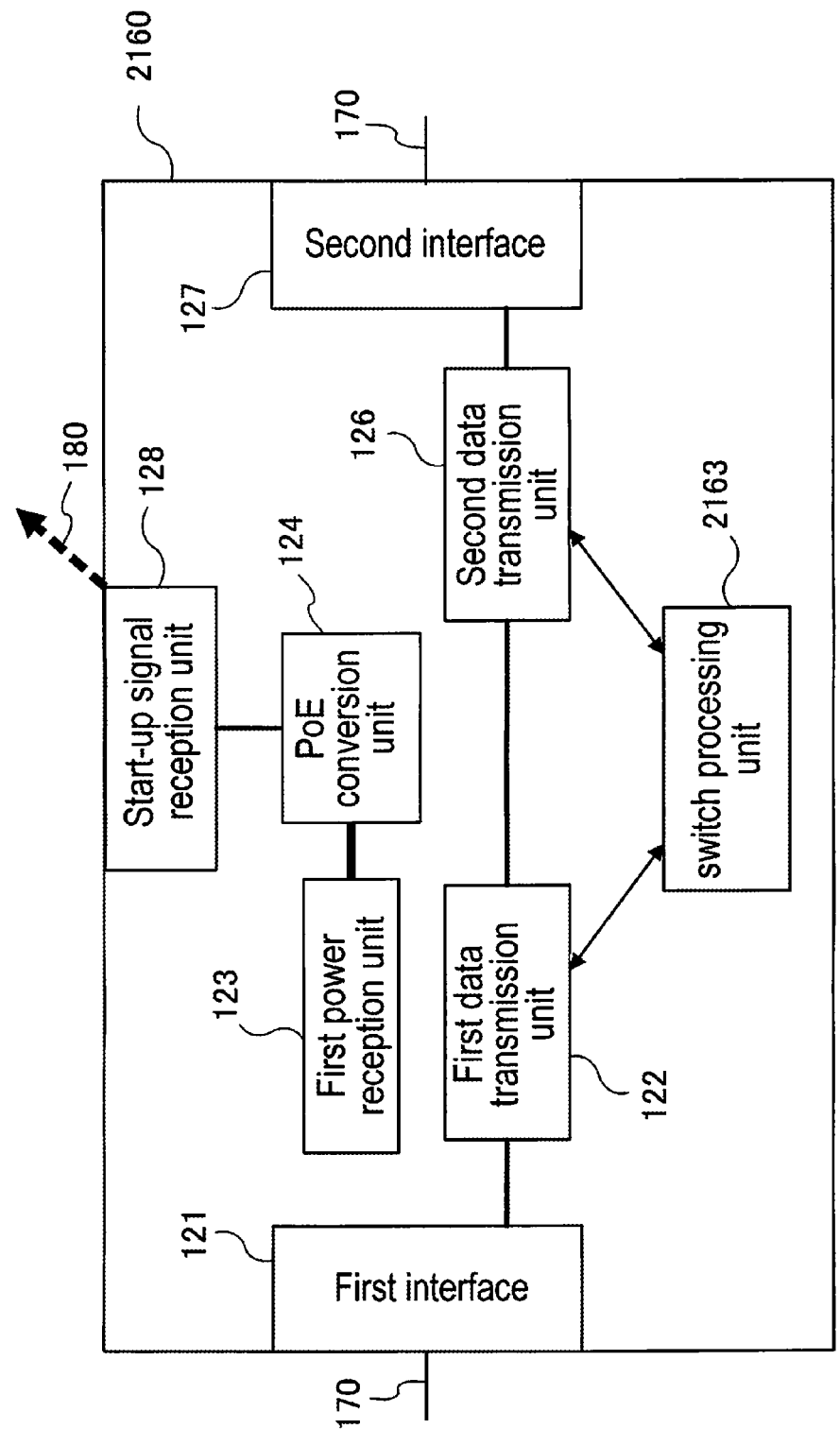
FIG. 15 is a block diagram of a node to be started side switch according to the fourth modification of the first embodiment of the present invention.

FIGS. 14 and 15 are block diagrams of the start node side switch 2150 and node to be started side switch 2160, respectively.

The start node side switch 2150 has substantially the same configuration as that of the start node side adapter 110 of FIG. 3 and only differs therefrom in that a switch processing unit 2153 and a PoE power supply unit 2154 are newly provided and that the power reception unit 113 for receiving the PoE power is omitted. The start node side switch 2150 may further have a not-illustrated interface. The switch processing unit 2153 performs data transfer processing between devices (including not-illustrated devices) connected thereto. For example, the switch processing unit 2153 transfers data between the start node 130 and another device (e.g., node to be started side switch 2160). The PoE power supply unit 2154 supplies the PoE power to the PoE controller 114. The PoE controller 114 generates the start-up power signal not based on the power received from the switch but based on the PoE power supplied from the PoE power supply unit 2154.

The node to be started side switch 2160 has substantially the same configuration as that of the node to be started side adapter 120 of FIG. 4 and only differs therefrom in that a switch processing unit 2163 is newly provided and that the second power reception unit 125 is omitted. The node to be started side switch 2160 may further have a not-illustrated interface. The switch processing unit 2163 performs data transfer processing between devices (including not-illustrated devices) connected thereto. For example, the switch processing unit 2163 transfers data received from the start node side switch 2150 or data to be transmitted to the node 140 to be started to another device.

In the system described in the first embodiment, simple addition of the adapters (start node side adapter 110 and node to be started side adapter 120) to an existing network environment allows the start-up signal reaching range to be expanded at low cost. This configuration is suitable for constructing a system by additional introduction of components to an existing system. On the other hand, the present modification is an example in which a system in which a configuration of the switch itself is altered is newly introduced, i.e., an example in which the start node side switch 2150 obtained by integrating the conventional typical switch and start node side adapter 110 and node to be started side switch 2160 obtained by integrating the conventional typical switch and node to be started side adapter 120 are provided in the system.

The start node side adapter 110 can be realized by using, e.g., a general-purpose computer having an interface corresponding to the first interface 111 and another interface corresponding to the second interface 117 as basic hardware. That is, the first data transmission unit 112, power reception unit 113, PoE controller 114, power transmission unit 115, second data transmission unit 116, and start-up signal reception unit 118 can be realized by a processor mounted in the above computer executing a program. At this time, the start node side adapter 110 may be realized by previously installing the above program in the computer or by installing the program as needed from a storage medium such as a CD-ROM in which the program is stored or through a network on which the program is distributed.

The node to be started side adapter 120 can be realized by using, e.g., a general-purpose computer having an interface corresponding to the first interface 121 and another interface corresponding to the second interface 127 basic hardware. That is, the first data transmission unit 122, first power reception unit 123, PoE conversion unit 124, second power reception unit 125, second data transmission unit 126, and start-up signal transmission unit 128 can be realized by a processor mounted in the above computer executing a program. At this time, the node to be started side adapter 120 may be realized by previously installing the above program in the computer or by installing the program as needed from a storage medium such as a CD-ROM in which the program is stored or through a network on which the program is distributed.

<Second Embodiment>

Figure 16:
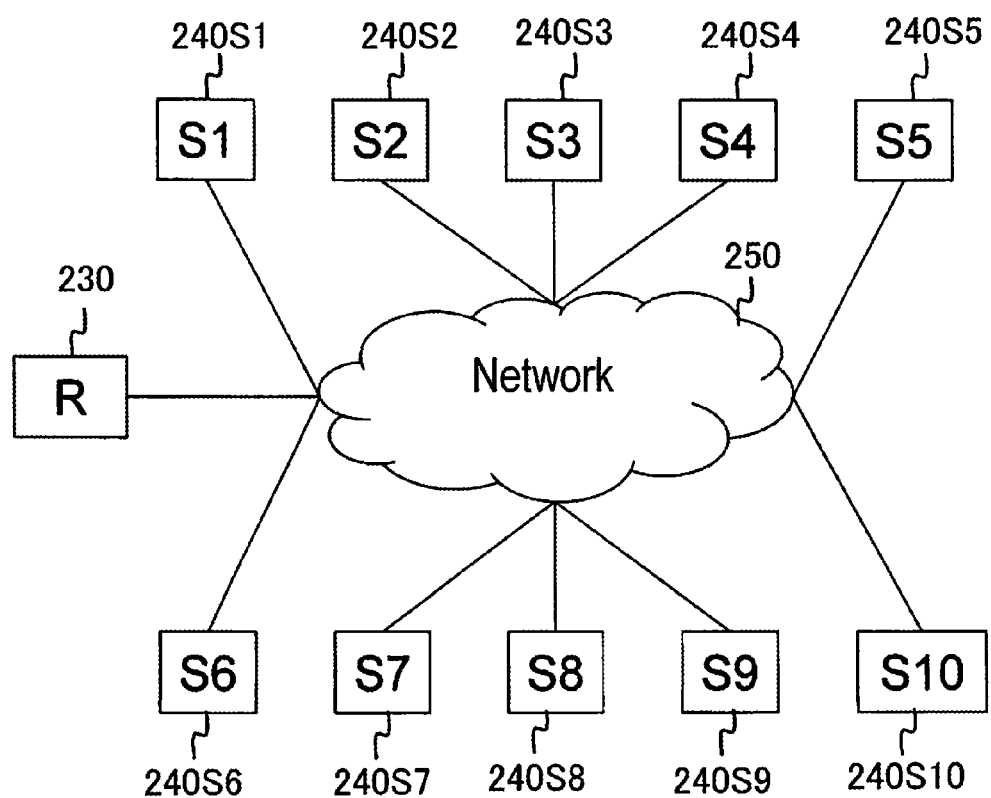
FIG. 16 is a view illustrating a communication system according to a second embodiment of the present invention.

FIG. 16 is a view illustrating the communication system according to the second embodiment. A communication system according to a second embodiment of the present invention will be described.

There is a case where one start node needs to remotely start up a node group including a plurality of nodes to be started. As a method of starting up a node group including a plurality of nodes to be started, there is known a method of making the nodes to be started constituting the node group have a common node group address (Jpn. Pat. Appln. Laid-Open Publication No. 2006-325046). In this technique, when a node 240 to be started receives a start-up signal including a group address which is transmitted from a start node 230, the node 240 compares the group address included in the start-up signal and a group address retained by the node 240 itself and performs start-up processing when the addresses coincide with each other.

In this related art, a node group constituted by a plurality of nodes to be started can be started up by a single start-up signal.

However, in this related art, in the case where the node 240 to be started belongs to a plurality of node groups, the node 240 needs to store a group address for each node group to which it belongs, which linearly increases data amount as the node group to which the node 240 increases.

As a method for overcoming the problem of a linear increase in the data amount in the node 240 to be started, a technique that uses a hash function has been disclosed (Jpn. Pat. Appln. Laid-Open Publication No. 2006-352806). In this related art, the address of a given group is created by logical OR of hash values of the addresses of nodes belonging to the group. A start node 230 transmits a group address (start-up signal including the group address) created in such a manner. A node 240 to be started that has received this group address compares the received group address and hash value of the node address of the node 240 itself and performs start-up processing when the received group address and hash value coincide with each other. According to this related art, the data amount that the node to be started needs to retain for the start-up processing can be made constant irrespective of the number of the node groups.

However, in the related art, erroneous start-up of the node 240 to be started may occur due to use of the hash function. In the hash function, there may be a case where output value calculated by the hash function is the same (hash value collision) even when different data is input to the hash function. Therefore, in the above related art, there may be a case where the node 240 to be started that has received a start-up signal including the address of a group to which it does not actually belong erroneously performs start-up processing due to accidental coincidence of the hash values. The occurrence of erroneous start-up not only makes system behavior unstable but also results in unnecessary power consumption due to unnecessary start-up.

The start node according to the present embodiment is a technique aiming to make the data amount in the node to be started constant and to prevent occurrence of erroneous start-up by using a hash function for a system in which one start node starts up a node group including a plurality of nodes to be started.

In the communication system according to the second embodiment as shown in FIG. 2, a start node 230 and a plurality of nodes 240S1 to 240S10 to be started are connected through a network 250. Hereinafter, the nodes 240S1 to 240S10 to be started are referred to as nodes 240 to be started when collectively referred to.

Although one start node 230 is illustrated in the example of FIG. 16, the communication system according to the second embodiment may include a plurality of the start nodes 230.

It is assumed here that the start-up signal transmitted from the start node 230 can reach all the nodes 240 to be started, and the reaching range is not a problem here. The communication in the system of the present embodiment may be achieved by using a commonly-used communication link or a near field communication link. In the case where the near field communication link is used, the PoE may be used to extend the link according to the method described in the first embodiment so as to make the start-up signal reach a target device. The nodes 240S1 to 240S10 to be started are grouped into one or more groups. The group is uniquely identified by a group address. A determination method of the group address will be described later. The start node 230 transmits the start-up signal specifying one group address so as to start up all the nodes 240 to be started belonging to the group.

Figure 17:
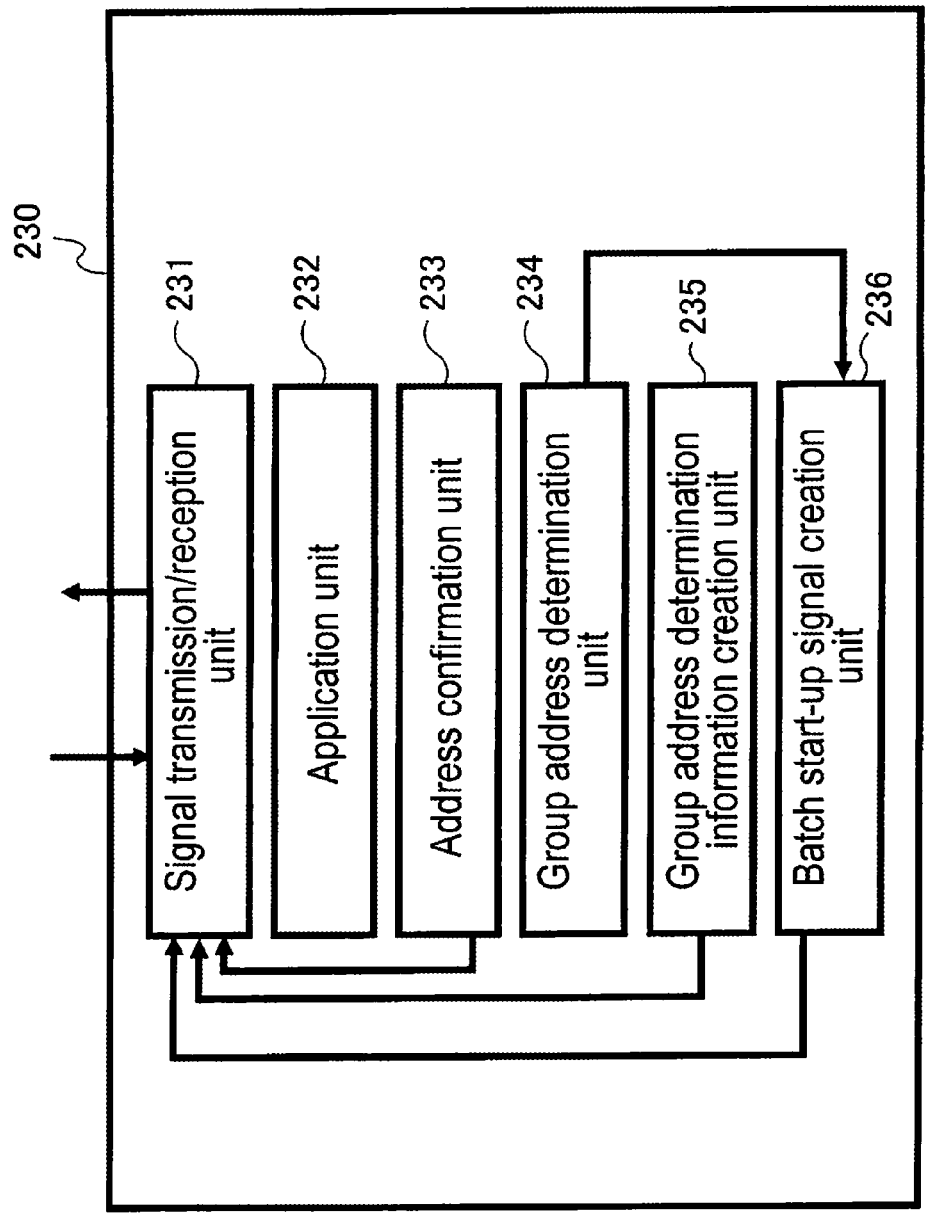
FIG. 17 is a block diagram illustrating the start node according to the second embodiment of the present invention.
Figure 18:
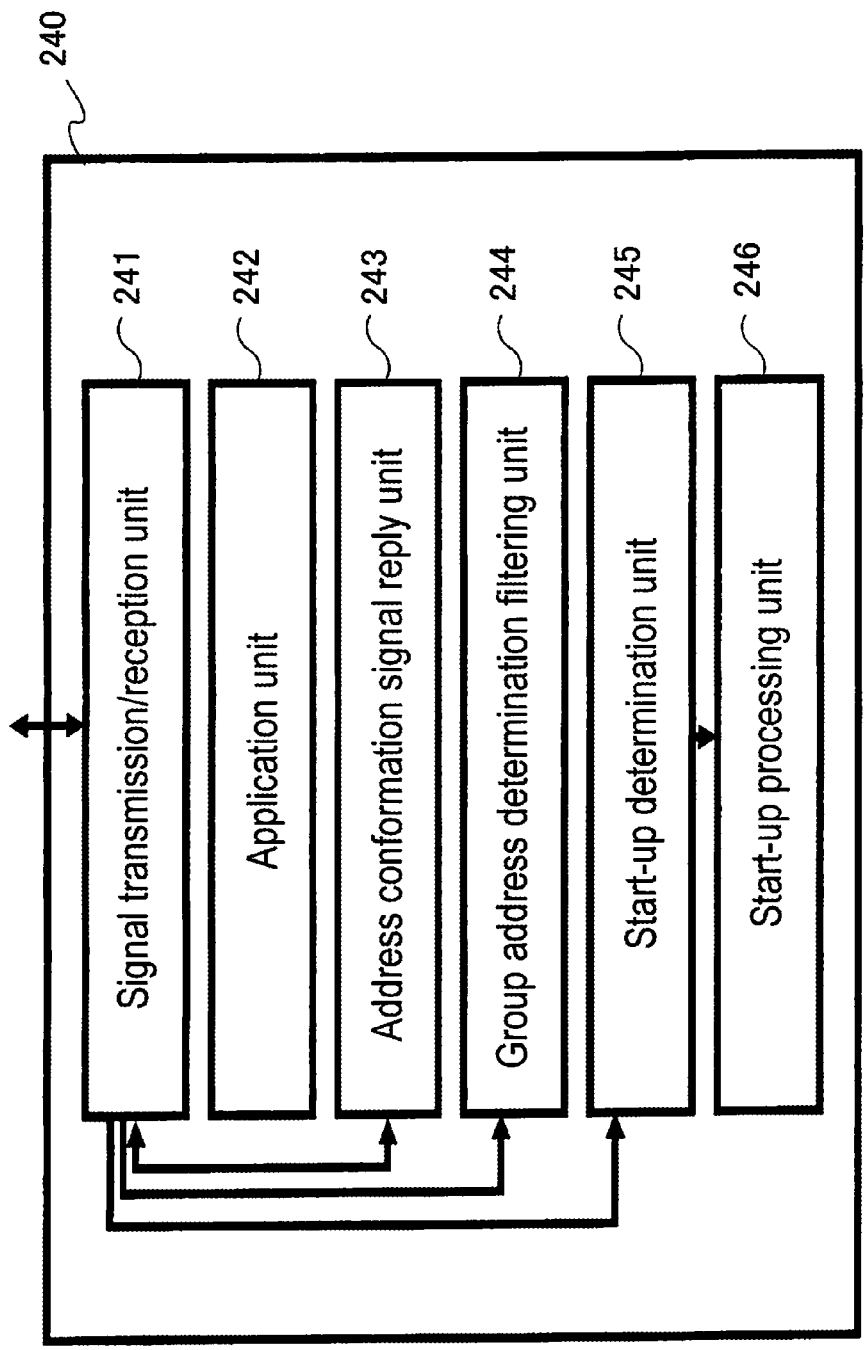
FIG. 18 is a block diagram illustrating the nodes to be started according to the second embodiment of the present invention.

With reference to FIGS. 17 and 18, configurations of the start node 230 and node 240 to be started will be described.

FIG. 17 is a block diagram illustrating the start node 230 according to the second embodiment of the present invention.

A signal transmission/reception unit 231 executes transmission/reception of a signal.

An application unit 232 executes an application.

An address confirmation unit 232 inquires about the address of the node to be started in a node to be started searching phase to be described later.

A group address determination unit 234 executes a group address determination procedure in a group address determination phase to be described later to create a group address.

A group address determination information creation unit 235 creates group address determination information in a group address determination phase to be described later.

A batch start-up signal creation unit 236 creates a batch start-up signal in a group specification/start-up phase to be described later.

FIG. 18 is a block diagram illustrating the nodes 240 to be started according to the second embodiment of the present invention.

A signal transmission/reception unit 241 executes transmission/reception of a signal.

An application unit 242 executes an application.

An address confirmation signal reply unit 243 replies to a node to be started address confirmation signal in a node to be started searching phase to be described later.

A group address determination filtering unit 244 receives the group address determination information in a group address determination phase to be described later and stores a group address determination filter.

A start-up determination unit 245 receives the batch start-up signal in a group specification/start-up phase to be described later and executes start-up determination.

A start-up processing unit 246 executes start-up processing according to an instruction of the start-up determination unit 245.

Figure 19:
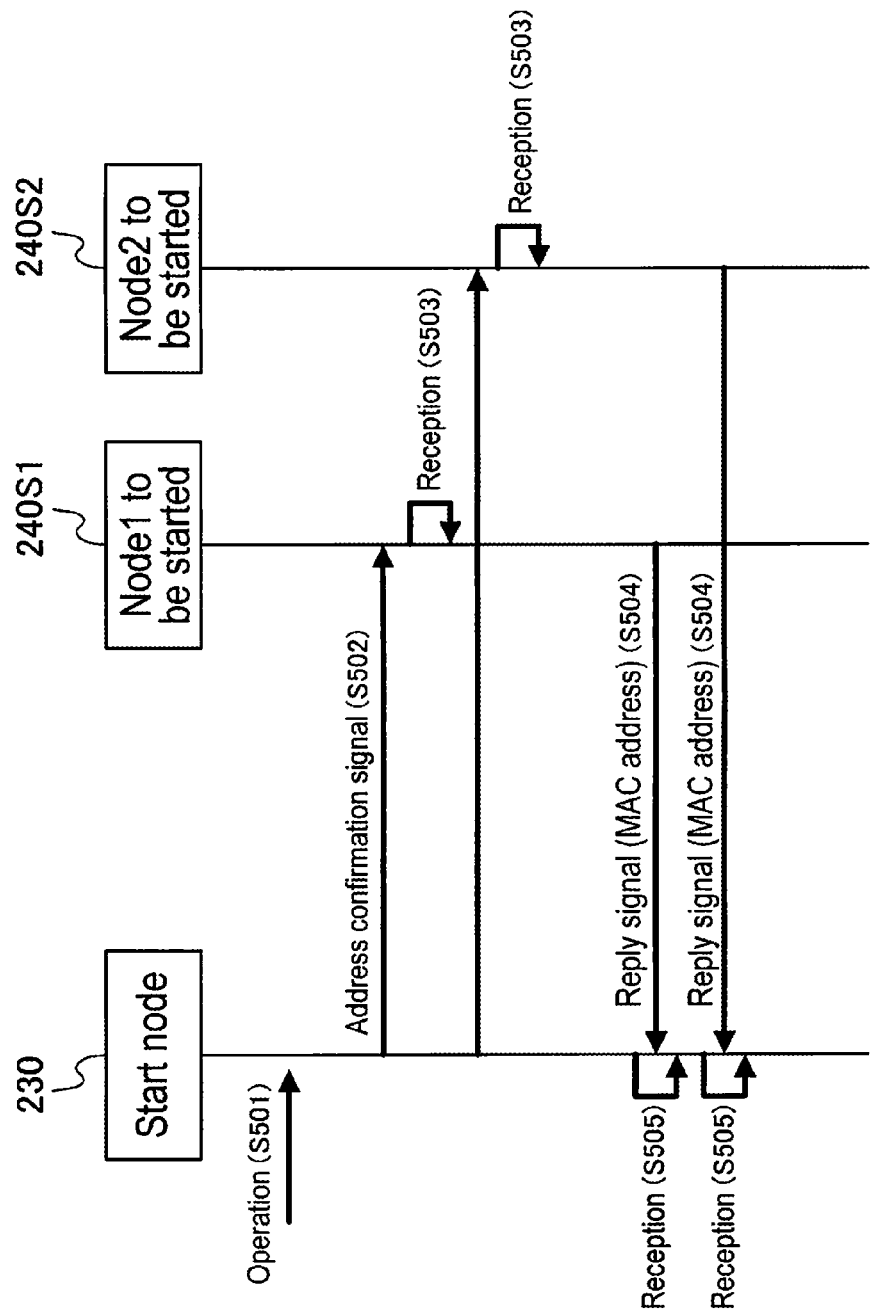
FIG. 19 is a sequence diagram illustrating operation of a node to be started searching phase in the communication system according to the second embodiment of the present invention.
Figure 20:
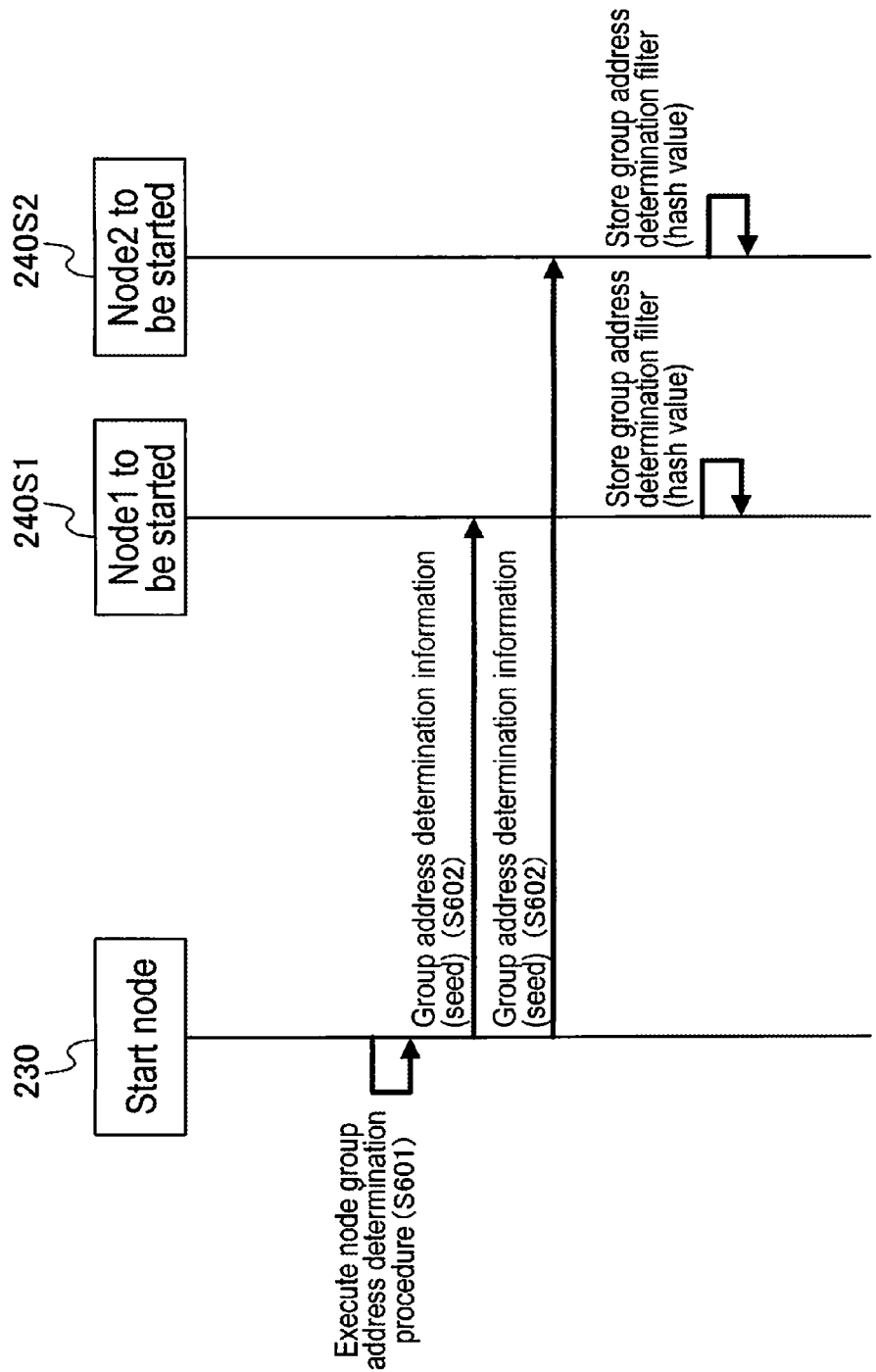
FIG. 20 is a sequence diagram illustrating operation of a group address determination phase in the communication system according to the second embodiment of the present invention.
Figure 21:
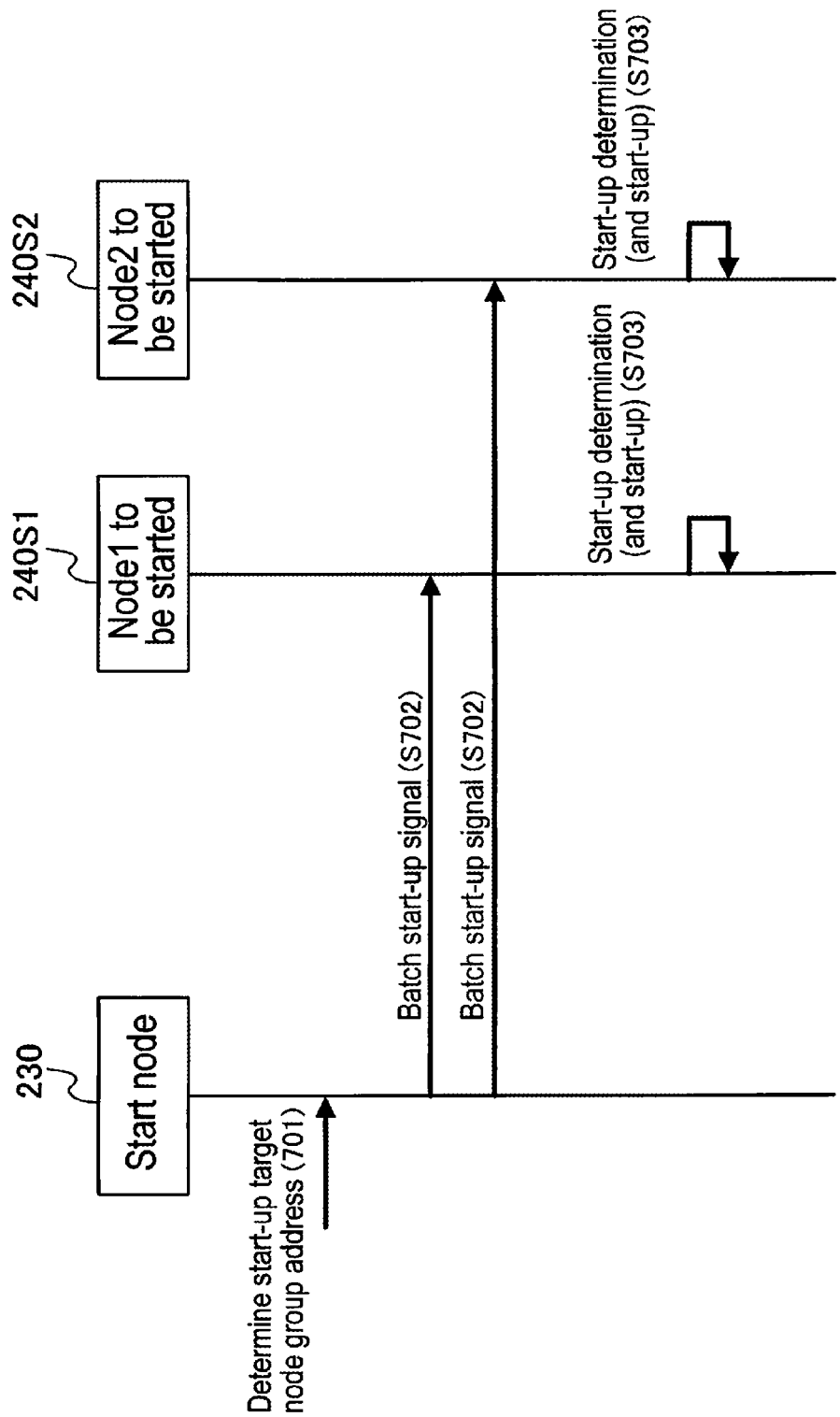
FIG. 21 is a sequence diagram illustrating operation of a group specification/start-up phase in the communication system according to the second embodiment of the present invention.

With reference to FIGS. 19 to 21, operation of the system according to the present embodiment will be described. FIG. 19 is a sequence diagram illustrating operation of a node to be started searching phase in the communication system according to the second embodiment of the present invention. FIG. 20 is a sequence diagram illustrating operation of a group address determination phase in the communication system according to the second embodiment of the present invention. FIG. 21 is a sequence diagram illustrating operation of a group specification/start-up phase in the communication system according to the second embodiment of the present invention. Although two nodes 240 to be started (node 240S1 to be started and node 240S2 to be started) are illustrated in the respective examples of FIGS. 19 to 21, the number of the nodes 240 to be started is not limited to this. In the following description, the node 240S1 to be started and node 240S2 to be started are collectively referred to as nodes 240 to be started.

A method for the start node 230 to collectively start up the nodes 240 to be started includes the following three phases: (A) "node 240 to be started searching phase", (B) "group address determination phase", and (C) "group specification/start-up phase". The phases (A), (B), and (C) are carried out in this order.

(A) The node 240 to be started searching phase is a phase in which the start node 230 grasps the node addresses of all the nodes 240 to be started existing in the system (network).

(B) The group address determination phase is a phase in which the start node 230 selects some nodes 240 to be started as a start-up target group and determines a group address to be assigned to the start-up target group. The start node 230 can define a plurality of the start-up target groups. For example, in the case of the configuration illustrated in FIG. 16, a first group in which node 240S1 to be started to nodes 240S6 to be started are set as the start-up targets and a second group in which node 240S1 to be started to node 240S8 to be started are set as the start-up targets are defined. In the case where a plurality of the start-up groups are defined, the staring node 230 creates the group address for each group.

(C) The group specification/start-up phase is a phase in which the start node 230 transmits the start-up signal specifying the group address determined in the phase (B) so as to start up all the nodes to be started belonging to the start-up target group corresponding to the group address. In the case where a plurality of the start-up target groups have been defined in the (B) group address determination phase, a plurality of group addresses are created. Thus, in the (C) group specification/start-up phase, which one of the plurality of the start-up target groups is started up is determined, and the nodes 240 to be started belonging to the determined group are started up.

The phases (A) and (B) are executed as an initialization procedure of the system. Thus, after the phases (A) and (B) have been executed once, only the phase (C) may be executed more than once.

The details of the above three phases (A) to (C) will be described.

First, (A) node to be started searching phase will be described with reference to FIG. 19.

Note that in the case where the addresses (MAC addresses) of all the nodes 240 to be started constituting the system have already been grasped at the start time of the node to be started searching phase, (A) node to be started searching phase may be skipped.

First, the start node 230 is operated (S501) to determine the nodes 240 to be started collectively. This is a phase depending on an application.

Then, the start node 230 transmits "address confirmation signal" (S502). The start node 230 transmits the address confirmation signal to all the nodes 240 to be started by broadcast communication.

Then, the nodes 240 to be started receive the address confirmation signal (S503). The nodes 240 to be started that have received the address confirmation signal each create a reply signal including its own node address (e.g., MAC address) and transmit the reply signal to the start node 230 which is a transmission source of the address conformation signal (S504).

The start node 230 receives the reply signal (S505) and acquires the addresses of all the nodes 240 to be started from the received reply signals. For example, in the example of FIG. 16, the start node 230 acquires the node addresses of the nodes 240S1 to nodes 240S10.

Next, (B) group address determination phase will be described with reference to FIG. 20. FIG. 20 is a sequence diagram illustrating operation of the group address determination phase in the communication system according to the second embodiment of the present invention.

First, the start node 230 determines, based on the addresses of all the nodes 240 to be started acquired in the phase (A), a group address specified for collectively starting up the nodes 240 to be started belonging to the start-up target group and a seed notified to the nodes 240 to be started (601). This procedure of determining a group address based on the addresses of the nodes 240 to be started is referred to as "group address determination procedure". The details of the "group address determination procedure" will be described later.

After executing the "group address determination procedure", the start node 230 determines the group address (hereinafter, the bit width of the group address is referred to as "group address length") and a seed for use in hash value calculation to be notified to the nodes 240 to be started. As described later, this seed is used for each of the nodes 240 to be started to determine whether it is included or not in the group corresponding to the group address.

The start node 230 transmits group address determination information including the seed determined in (S601) to the nodes 240 to be started (S602).

The nodes 240 to be started receive the group address determination information. Then, the nodes 240 to be started each input the seed included in the group address and its own node address (MAC address) to a hash algorithm shared with the start node 230 to obtain a hash value. The hash values calculated here range from "0" to "group address length −1".

The nodes 240 to be started each store the hash value as "group address determination filter" (S603).

Next, (C) group specification/start-up phase will be described with reference to FIG. 21. FIG. 21 is a sequence diagram illustrating operation of the group specification/start-up phase in the communication system according to the second embodiment of the present invention.

The start node 230 is operated to determine execution of a batch start-up request specifying a given group address. In this operation, a batch start-up target group address is determined (S701). In the case where the start node 230 has defined a plurality of groups in (B) group address determination phase, it determines which one of the plurality of groups is to be started by specifying the group address. For example, the start node 230 determines which one of the first group (in which node 240S1 to be started to nodes 240S6 to be started are set as the start-up targets) and second group (in which node 240S1 to be started to node 240S8 to be started are set as the start-up targets) is to be started by specifying the group address.

Next, the start node 230 transmits "batch start-up signal" including the group address determined in S701 (S702).

The nodes 240 to be started receive the "batch start-up signal" and extract the group address included in the batch start-up signal. Then, the nodes 240 to be started execute "start-up determination" (S703). Concretely, the nodes 240 to be started each compare the "group address determination filter" stored therein and group address extracted from the "batch start-up signal". At this time, in the case where the group address determination filter (value of the hash value of the MAC address) and the bit position of "1" in the group address coincide with each other, the node 240 to be started starts up itself.

The sequences of the respective three phases in the present embodiment have thus been described.

Next, the "group address determination procedure" executed in (B) group address determination phase will be described. The "group address determination procedure" is a procedure executed when a start-up target node group is newly defined. In the group address determination procedure, a set ("belonging" set) of node addresses of the nodes 240 to be started that belong to the node group and a set ("non-belonging" set) of node addresses of the node 240 to be started that do not belong to the node group are created for the nodes 240 to be started constituting the system. Then from the pair of the belonging set and non-belonging set, one group address of the node group and one hash function seed used as group address determination information are calculated. In the case where a plurality of node groups are defined, a plurality of group addresses and one hash function seed are calculated from a plurality of the belonging sets and non-belonging sets.

Figure 22:
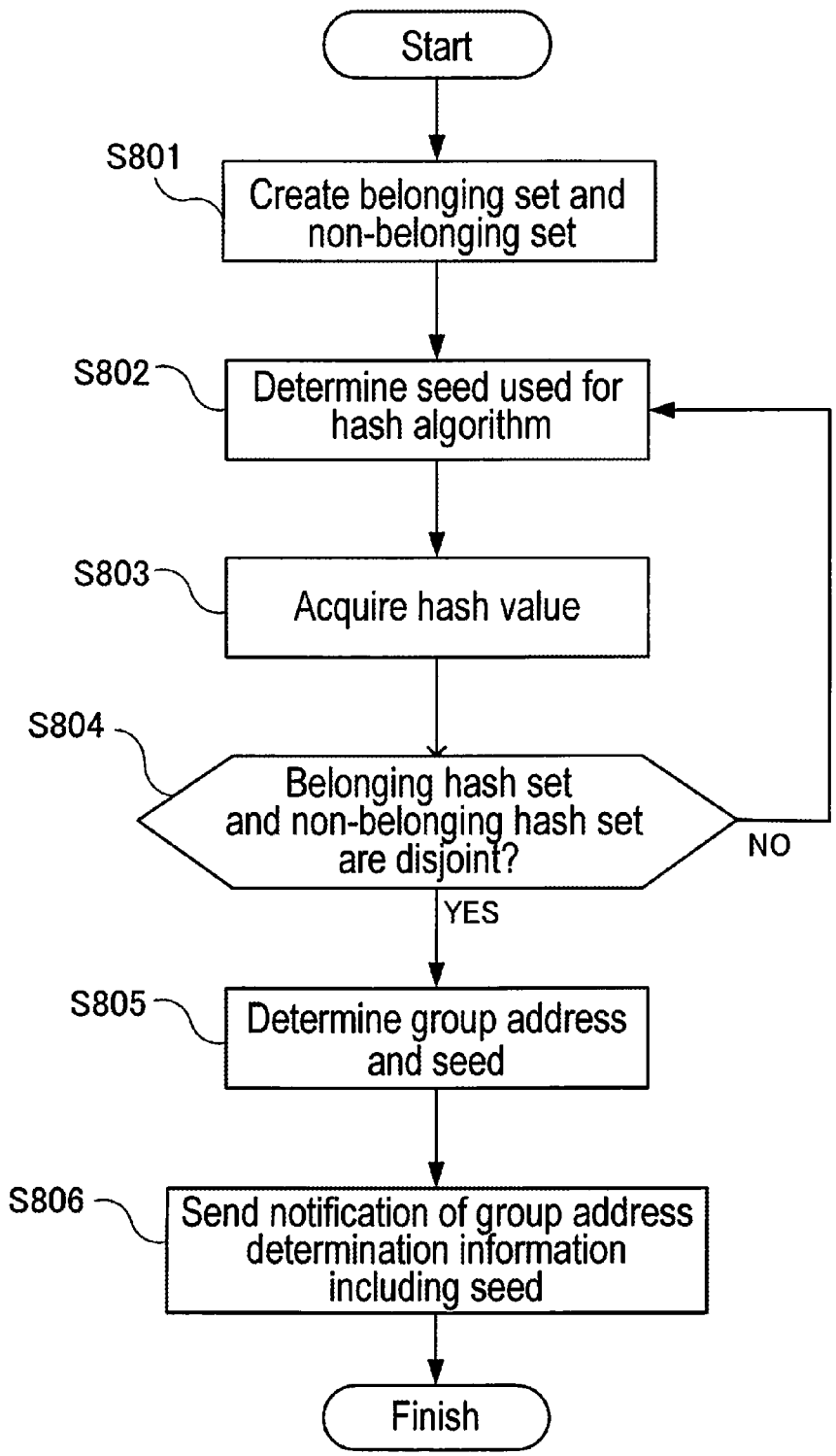
FIG. 22 is a flowchart illustrating operation of a group address determination phase performed by the start node according to the second embodiment of the present invention.

With reference to FIG. 22, the "group address determination procedure" will be described more concretely. FIG. 22 is a flowchart illustrating operation of the group address determination phase performed by the start node 230 according to the second embodiment of the present invention.

First, a set ("belonging" set) of node addresses of the nodes 240 to be started that belong to the node group and a set ("non-belonging" set) of node addresses of the node 240 to be started that do not belong to the node group are created for the nodes 240 to be started constituting the system (S801). In the case where a plurality of node groups are defined, a plurality of pairs of the belonging set and non-belonging set are created.

Then, an initial value of the seed to be input to the hash algorithm is determined to define a hash function H (S802).

In S802, the node address (bit width m) of the node 240 to be stared and seed are input to the hash algorithm. The output of this hash algorithm is an integer (value ranging from "0" to "group address length −1"). In the hash algorithm, when the seed is identified, the hash function H is determined. By changing the value given as the seed, a different hash function can be determined.

The same hash algorithm as that retained by the start node 230 is shared among all the nodes 240 to be started. Thus, simply giving the same seed allows the start node 230 and all the nodes 240 to be started to share the hash function H that can obtain the same output for all inputs.

Then, the hash function H is used to generate hash values based on the node addresses of all the nodes 240 to be started (irrespective of the set (belonging set or non-belonging set) to which they belong) (S803).

Then, it is confirmed whether a set (referred to as "belonging hash set") of the hash values generated from the node addresses of the nodes 240 to be started of the belonging set and a set (referred to as "non-belonging hash set") of the hash values generated from the node addresses of the nodes 240 to be started of the non-belonging set are disjoint or not (S804). In the case where a plurality of node groups are defined, it is confirmed whether the disjoint relationship is satisfied or not for a plurality of pairs of the belonging set and non-belonging set. When it has been confirmed that the disjoint relationship is satisfied for all the pairs (YES in S804), the flow advances to S805. Otherwise, (i.e., case where the disjoint relationship is not satisfied at least for one pair) (NO in S804), the seed given to the hash algorithm is changed to change the hash function H, and the flow returns to S802.

After the hash function H (i.e., seed) by which the belonging hash set and non-belonging hash set are disjoint has been determined (YES in S804), the seed obtained at this time is set as the seed used as the group address determination information. Further, at this time, a value determined according to the following expression (1) is set as the group address (S805).

$$\Sigma 2^{\wedge}(\text{hash function H}(\text{address of belonging set})) \qquad (1)$$

The expression (1) says that the value of n-bit length in which 1s are placed in the bit positions corresponding to the hash values (value ranging from "0" to "group address length −1") obtained by putting all the addresses of the node 240 to be started into the hash function H and 0s are placed in the other bit positions is the group address. In the case where a plurality of groups are defined, the value of n-bit length in which 1s are placed in the bit positions corresponding to the hash values of the belonging hash set and 0s are placed in other bit positions is created for each group. As a result, the group address different for each group can be created.

The group address is determined as described above in the "group address determination procedure".

In the present embodiment, in step S804, it is confirmed whether the belonging hash set and non-belonging hash set are disjoint or not and, if they are not disjoint, the hash function (i.e., seed) is altered to determine the hash function (seed) by which the belonging hash set and non-belonging hash set are made disjoint (repetition of processing from S802 to S804). By making the belonging hash set and non-belonging hash set disjoint, it is possible to prevent erroneous start-up which occurred in related arts when the generated group address is used to perform batch start-up. That is, by altering the hash function until the belonging hash set and non-belonging hash set become disjoint, the group address that may cause the erroneous start-up can be excluded.

An example of the group address determination phase will be described.

FIGS. 23A and 23B are views illustrating parameters in one example of the group address determination procedure in the communication system according to the second embodiment of the present invention. FIG. 23A illustrates the hash algorithm, group address length, and seed. It is assumed that the group address length (n) is 8-bit. FIG. 23B illustrates whether each of the node addresses (MAC addresses) of the nodes 240 to be started belongs to the belonging set (i.e., start-up target group) or non-belonging set. In a first group of FIG. 23B, the node addresses of nodes 240S1 to 240S6 are included in the belonging set, and node addresses of nodes 240S7 to 240S10 are included in the non-belonging set.

Figures 24A, 24B:
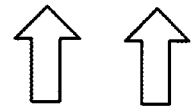
FIGS. 24A and 24B are views illustrating calculation results in the group address determination procedure in the communication system according to the second embodiment of the present invention.

FIGS. 24A and 24B are views illustrating calculation results in the group address determination procedure in the communication system according to the second embodiment of the present invention.

FIG. 24A illustrates hash values obtained by inputting the node addresses of the nodes 240S1 to 240S10 to the hash function H in the case where the seed is changed as 1, 1.1, 1.2, 1.3, . . . . As can be seen from FIG. 24A, in the hash function obtained by setting the seed to 1 and 1.1, the belonging hash set and non-belonging hash set are not disjoint. Then, when the hash function obtained by setting the seed to 1.2 is used, the belonging hash set and non-belonging hash set become disjoint for the first time. Then, as illustrated in FIG. 24B, the group address corresponding to the first group is determined as a 8-bit value in which 1s are placed in the bit positions corresponding to the values of the belonging hash set and 0s are placed in the other bit positions, i.e., "10001110". Further, the seed to be notified to the nodes 240 to be started can be determined as 1.2.

In the case where a plurality of node groups are defined, all the pairs of the belonging hash set and non-belonging hash set need to be disjoint. For example, assumed is a case where two node groups are defined. In a first group, nodes 240S1 to 240S6 are set as the start-up targets. In a second group, nodes 240S1 to 240S8 are set as the start-up targets. In this case, both a pair of the belonging hash set and non-belonging hash set of the first group and a pair of the belonging hash set and non-belonging hash set of the second group need to be disjoint. In the examples of FIGS. 24A and 24B, in the case where the seed is 1.2, the belonging hash set and non-belonging hash set of the first group are disjoint as described above. Further, as can be seen from FIGS. 24A and 24B, the belonging hash set and non-belonging hash set of the second group are also disjoint.

The group address corresponding to the first group can be determined as "10001110". The group address corresponding to the second group can be determined as "10011110". Thus, by placing 1s in the bit positions corresponding to the values of the belonging hash set and 0s in the other bit positions so as to create the group address of the second group, it is possible to define a group address different from the group address of the first group. That is, different group addresses can easily be set for respective groups. In this case, the seed can be determined as 1.2.

The seed obtained here is transmitted to the nodes 240 to be started as the group address determination information in (B) group address determination phase (S806). Upon reception of the seed, the nodes 240 to be started each execute a previously defined hash algorithm by inputting the received seed and its own node address to generate a hash value and stores the generated hash value as the "group address determination filter". Concretely, the values of the "group address determination filter" of the nodes 24031 to 240S10 to be started are the same as the hash values of the MAC addresses of the nodes 240 S1 to S10 to be started listed in the column of "seed: 1.2" of the table of FIG. 24A.

Then, when selecting the first group, the start node 230 transmits a batch start-up signal specifying "10001110" as the group address in (C) group specification/start-up phase. Upon reception of the batch start-up signal, the nodes 240 to be started each perform the start-up determination. As described above, the group address is created such that 1s are placed in the bit positions corresponding to the values of the belonging hash set and 0s in the other bit positions. The nodes 240 to be started that have received the group address each compare the value of the group address in the bit position based on the hash value of its own node address. Then, when the value of the group address in the bit position corresponding to the hash value of the node address is 1, start-up operation is performed, while when the value is 0, start-up operation is not performed. As a result, all the nodes 240 to be started of the belonging set are started up, and the other nodes 240 to be started are not started up. For example, as can be seen from FIG. 24A, the hash value of the node address of the node 240S1 to be started of the belonging set is 3, and bit position of the group address corresponding to 3 is the fourth position from the right (since the bit position is counted from the right as 0, 1, 2, 3, 4, . . . ). The fourth bit position from the right indicates 1. Thus, the node 240S1 to be started is started up. On the other hand, the hash value of the node address of the node 240S7 to be started of the belonging set is 4, and bit position of the group address corresponding to 4 is the fifth position from the right. The fifth bit position from the right indicates 0. Thus, the node 240S7 to be started is not started.

As described above, in the system in which one start node 230 starts up the node group including a plurality of nodes 240 to be started, the start node 230 according to the present embodiment can make the data amount of the node 240 to be started constant by using the hash function. Further, by setting the hash function (seed) such that the belonging hash set and non-belonging hash set are disjoint, it is possible to prevent the node 240 to be started from being erroneously started up.

The start node 230 can be realized by using, e.g., a general-purpose computer as basic hardware. That is, the signal transmission/reception unit 231, application unit 232, address confirmation unit 233, group address determination unit 234, group address determination information creation unit 235, and batch start-up signal creation unit 236 can be realized by a processor mounted in the above computer executing a program. At this time, the start node 230 may be realized by previously installing the above program in the computer or by installing the program as needed from a storage medium such as a CD-ROM in which the program is stored or through a network on which the program is distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication device comprising:
a signal reception unit that receives a start-up signal that a start node transmits for starting up a node to be started;
a first interface connected to Ethernet;
a second interface connected to Ethernet;
a power reception unit that receives PoE power through the first interface;
a PoE controller that receives the start-up signal and PoE power and gives a transmission instruction of a start-up power signal which is a PoE power signal having a signal pattern corresponding to the start-up signal; and
a power transmission unit that receives the transmission instruction from the PoE controller and transmits the start-up power signal through the second interface.

2. The communication device according to claim 1, being started up upon reception of the start-up signal.

3. A communication device comprising:
an interface connected to Ethernet;
a power reception unit that is capable of receiving PoE power through the interface and receives start-up power signal which is a PoE power signal having a signal pattern corresponding to a first start-up signal that a start node transmits for starting up a node to be started;
a PoE power conversion unit that receives the start-up power signal and gives a transmission instruction of a second start-up signal corresponding to a signal pattern of the start-up power signal; and
a start-up signal transmission unit that receives the transmission instruction from the PoE conversion unit and transmits the second start-up signal.

4. The communication device according to claim 3, being started up upon reception of the start-up power signal.

5. A communication device comprising:
a start-up signal reception unit that receives a start-up signal that a start node transmits for starting up a node to be started;
an interface connected to Ethernet;
a power supply unit that supplies PoE power;
a PoE controller that receives the start-up signal and PoE power and gives a transmission instruction of a start-up power signal which is a PoE power signal having a signal pattern corresponding to the start-up signal; and
a power transmission unit that receives the transmission instruction from the PoE controller and transmits the start-up power signal through the interface.

6. A system comprising:
a start node including a first start-up signal transmission unit that transmits a first start-up signal;
a first communication device including:
a first start-up signal reception unit that receives the first start-up signal;
a first interface connected to Ethernet;
a second interface connected to Ethernet;
a first power reception unit that receives PoE power through the first interface;
a PoE controller that receives the first start-up signal and PoE power and gives a transmission instruction of a start-up power signal which is a PoE power signal having a signal pattern corresponding to the first start-up signal; and
a power transmission unit that receives the transmission instruction from the PoE controller and transmits the start-up power signal through the second interface,
a second communication device including:
a third interface connected to Ethernet;
a second power reception unit that receives the start-up power signal through the third interface;
a PoE conversion unit that receives the start-up power signal and gives a transmission instruction of a second start-up signal corresponding to the signal pattern of the start-up power signal; and
a second start-up signal transmission unit that receives the transmission instruction from the PoE conversion unit and transmits the second start-up signal, and
a node to be started including a second start-up signal reception unit that receives the second start-up signal and being started up when receiving the second start-up signal.

7. The system according to claim 6, wherein
the second start-up signal reception unit of the node to be started converts the second start-up signal into electric power.

8. A start node for starting up a set of nodes to be started belonging to a specified group constituted by some of the nodes to be started that retain the same hash algorithm as a hash algorithm of the start node itself, comprising:
a group address determination unit that inputs a plurality of different seeds to the hash algorithm to define a hash function for each seed, inputs a node address of the node to be started to calculate a hash value for each hash function and, when a belonging hash set which is a set of the hash values of the nodes to be started belonging to the group and a non-belonging set which is a set of the hash values of the nodes to be started not belonging to the group are disjoint, generates a group address representing the belonging hash set and the non-belonging hash set;
a group address determination information creation unit that creates group address determination information including the seed input for defining the hash function for use in generating the group address;
a batch start-up signal generation unit that generates a batch start-up signal including the group address of the group to be started; and
a transmission unit that transmits the group address determination information and the batch start-up signal.

9. A system comprising the start node and node to be started as claimed in claim 8,
the nodes to be started including:
a reception unit that receives group address determination information transmitted from the start node and the batch start-up signal;
a group address determination filtering unit that inputs a seed contained in the group address determination information to the hash algorithm to define a hash function, inputs its own node address to the hash function to calculate a hash value so as to generate a group address determination filter;
a start-up determination unit that compares the group address contained in the batch start-up signal and the group address determination filter so as to determine whether or not the node to be started itself belongs to the group to be started; and a start-up processing unit that performs start-up operation when the start-up determination unit has determined that the node to be started belongs to the group to be started but does not start up the node to be started when the start-up determination unit has determined that the node to be started does not belong to the group to be started.

10. A computer program product having a non-transitory computer readable medium including programmed instructions for outputting information, wherein the instructions, when executed by a computer, cause the computer to perform:

receiving a start-up signal that a start node transmits for starting up a node to be started;

receiving PoE power through a first interface connected to Ethernet;

receiving the start-up signal and PoE power and giving a transmission instruction of a start-up power signal which is a PoE power signal having a signal pattern corresponding to the start-up signal; and receiving the transmission instruction and transmitting the start-up power signal through the second interface connected to Ethernet.

11. A Method comprising:

receiving a start-up signal that a start node transmits for starting up a node to be started;

receiving PoE power through a first interface connected to Ethernet;

receiving the start-up signal and PoE power and giving a transmission instruction of a start-up power signal which is a PoE power signal having a signal pattern corresponding to the start-up signal; and receiving the transmission instruction and transmitting the start-up power signal through the second interface connected to Ethernet.

* * * * *